(12) United States Patent
Yamazaki

(10) Patent No.: US 9,118,777 B2
(45) Date of Patent: Aug. 25, 2015

(54) MOBILE PHONE

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/487,950

(22) Filed: Jun. 4, 2012

(65) Prior Publication Data

US 2012/0276959 A1   Nov. 1, 2012

Related U.S. Application Data

(63) Continuation of application No. 12/275,738, filed on Nov. 21, 2008, now Pat. No. 8,478,346.

(30) Foreign Application Priority Data

Dec. 3, 2007 (JP) ................ 2007-312857

(51) Int. Cl.
*G06F 3/041* (2006.01)
*H04M 1/725* (2006.01)
(Continued)

(52) U.S. Cl.
CPC ........... *H04M 1/7258* (2013.01); *G06F 1/1626* (2013.01); *G06F 1/1656* (2013.01); *G06F 1/1684* (2013.01); *G06F 1/1694* (2013.01); *G06F 3/0421* (2013.01); *G06F 3/04886* (2013.01); *G06F 2200/1614* (2013.01); *G06F 2200/1637* (2013.01); *H04M 2250/12* (2013.01); *H04M 2250/22* (2013.01)
USPC .......................................... 455/566; 345/173

(58) Field of Classification Search
USPC ................ 345/156–158, 168, 169, 173, 175; 455/3.06, 66.1, 556.1, 556.2, 550.1, 455/566
See application file for complete search history.

(56) References Cited

U.S. PATENT DOCUMENTS 6,731,227 B2   5/2004   Horie
6,742,762 B2   6/2004   Koyama
(Continued)

FOREIGN PATENT DOCUMENTS

CN   1674600       9/2005
CN   1785723 A    6/2006
(Continued)

OTHER PUBLICATIONS

Search Report (European Patent Application No. 08019763.5), dated Mar. 24, 2009.
(Continued)

*Primary Examiner* — Dinh Le
(74) *Attorney, Agent, or Firm* — Nixon Peabody LLP; Jeffrey L. Costellia

(57) ABSTRACT

The mobile phone includes an optical sensor, a display element, a pixel circuit portion where a plurality of pixels having a plurality of transistors are arranged in matrix, an optical sensor control circuit which is connected to an optical sensor driver circuit for driving the optical sensor and reads a signal from the optical sensor, a display portion control circuit which is connected to a display element driver circuit for driving the display element and outputs an image signal for displaying an image on a display portion, a gradient detection portion for outputting a signal in accordance with a gradient of the mobile phone, and an arithmetic circuit for performing display in the pixel circuit portion by switching image signals output to the display portion control circuit with a signal from the gradient detection portion.

10 Claims, 19 Drawing Sheets

(51) Int. Cl.
  *G06F 1/16*    (2006.01)
  *G06F 3/042*   (2006.01)
  *G06F 3/0488*  (2013.01)

(56) References Cited

U.S. PATENT DOCUMENTS

| | | | |
|---|---|---|---|
| 6,747,290 B2 | 6/2004 | Yamazaki et al. | |
| 6,947,447 B1* | 9/2005 | Okamura | 370/470 |
| 7,068,254 B2 | 6/2006 | Yamazaki et al. | |
| 7,333,077 B2 | 2/2008 | Koyama et al. | |
| 7,355,338 B2 | 4/2008 | Osame et al. | |
| 7,365,750 B2 | 4/2008 | Yamazaki et al. | |
| 7,441,276 B2* | 10/2008 | Ueda et al. | 726/26 |
| 7,675,508 B2 | 3/2010 | Imai et al. | |
| 7,860,382 B2* | 12/2010 | Grip | 396/51 |
| 8,125,463 B2 | 2/2012 | Hotelling et al. | |
| 8,132,211 B2* | 3/2012 | Yamaguchi et al. | 725/61 |
| 8,213,734 B2 | 7/2012 | Wernersson | |
| 8,624,841 B2* | 1/2014 | Kim et al. | 345/168 |
| 8,719,719 B2* | 5/2014 | Cohen et al. | 715/764 |
| 8,760,414 B2* | 6/2014 | Kim | 345/173 |
| 2002/0026641 A1* | 2/2002 | Mukai et al. | 725/105 |
| 2002/0058529 A1* | 5/2002 | Horie et al. | 455/556 |
| 2003/0002007 A1* | 1/2003 | Meringer | 349/169 |
| 2003/0156100 A1 | 8/2003 | Gettemy | |
| 2004/0130524 A1 | 7/2004 | Matsui | |
| 2004/0174324 A1 | 9/2004 | Yamazaki et al. | |
| 2005/0212764 A1 | 9/2005 | Toba | |
| 2006/0071784 A1* | 4/2006 | Frank | 340/539.22 |
| 2006/0152668 A1 | 7/2006 | Jang et al. | |
| 2006/0197753 A1 | 9/2006 | Hotelling | |
| 2006/0199605 A1 | 9/2006 | Lin | |
| 2006/0229106 A1 | 10/2006 | Otaka et al. | |
| 2006/0238517 A1 | 10/2006 | King et al. | |
| 2006/0256093 A1 | 11/2006 | Furukawa et al. | |
| 2006/0279557 A1 | 12/2006 | Gettemy | |
| 2007/0057917 A1 | 3/2007 | Bae | |
| 2007/0070007 A1 | 3/2007 | Imai et al. | |
| 2007/0109260 A1 | 5/2007 | Moon et al. | |
| 2007/0200827 A1* | 8/2007 | Samal | 345/168 |
| 2008/0031606 A1* | 2/2008 | Zax et al. | 396/56 |
| 2008/0055263 A1* | 3/2008 | Lemay et al. | 345/173 |
| 2008/0088602 A1 | 4/2008 | Hotelling | |
| 2009/0011798 A1 | 1/2009 | Yamada | |
| 2009/0091541 A1 | 4/2009 | Chen | |
| 2009/0091542 A1 | 4/2009 | Inaba et al. | |
| 2009/0141004 A1 | 6/2009 | Yamazaki | |
| 2009/0303187 A1 | 12/2009 | Pallakoff | |
| 2012/0162078 A1 | 6/2012 | Ferren et al. | |
| 2013/0093680 A1 | 4/2013 | Ogita | |

FOREIGN PATENT DOCUMENTS

| | | |
|---|---|---|
| EP | 1 154 383 A2 | 11/2001 |
| EP | 1 580 967 A2 | 9/2005 |
| EP | 1 903 425 A1 | 3/2008 |
| EP | 1 995 939 A1 | 11/2008 |
| JP | 406301445 * | 10/1994 |
| JP | 07-200098 A | 8/1995 |
| JP | 2002-033823 | 1/2002 |
| JP | 2002-062964 | 2/2002 |
| JP | 2002-287900 | 10/2002 |
| JP | 2003-005879 A | 1/2003 |
| JP | 2003-234474 | 8/2003 |
| JP | 2003-280796 | 10/2003 |
| JP | 2006-317682 | 11/2006 |
| JP | 2007-243483 | 9/2007 |
| WO | WO-2007/007682 A1 | 1/2007 |
| WO | WO-2007/105369 A1 | 9/2007 |

OTHER PUBLICATIONS

Chinese Office Action (Application No. 200810179746.8), dated May 16, 2012.

Korean Office Action (Application No. 2008-0120344), dated Oct. 31, 2014.

Taiwanese Office Action (Application No. 97146664), dated Dec. 10, 2013.

Chinese Office Action (Application No. 200810179746.8), dated Dec. 14, 2012.

Korean Office Action (Application No. 2008-0120344), dated Mar. 12, 2015.

* cited by examiner

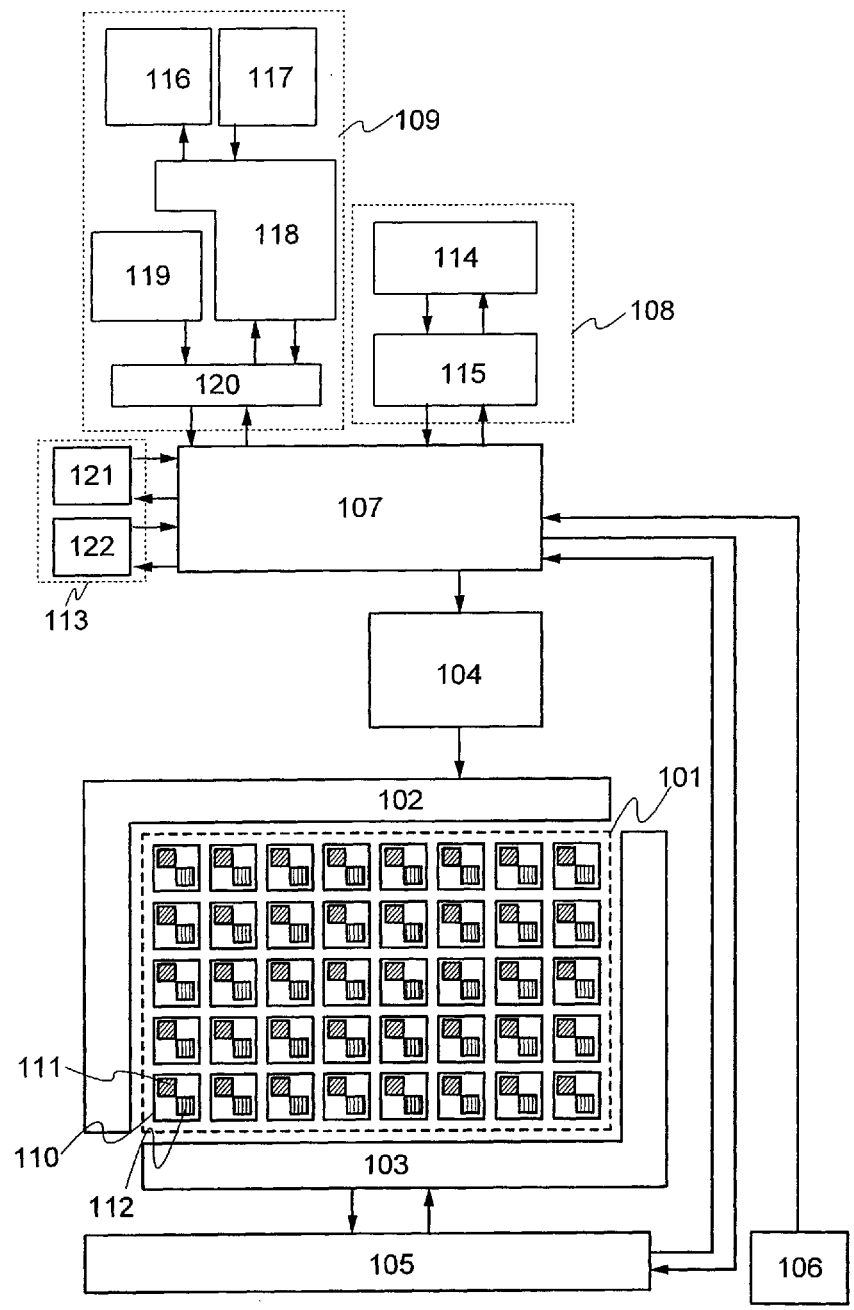

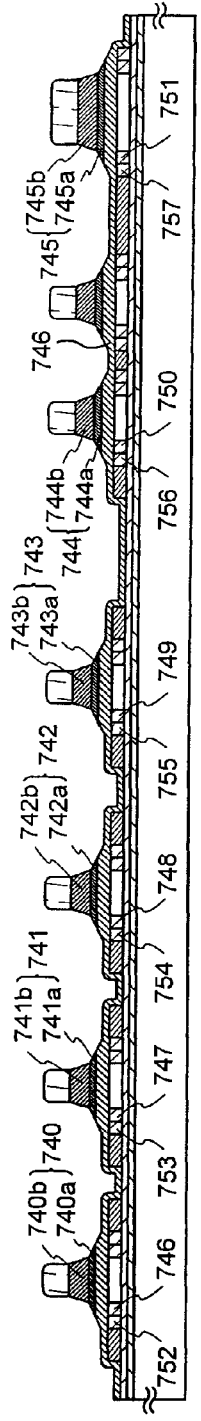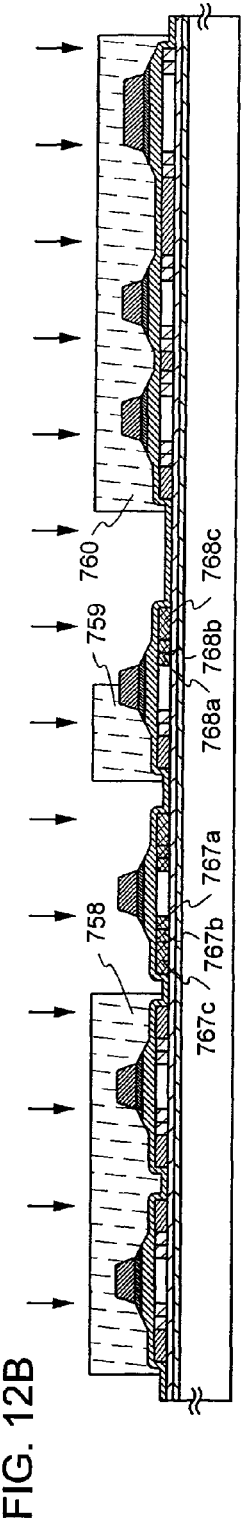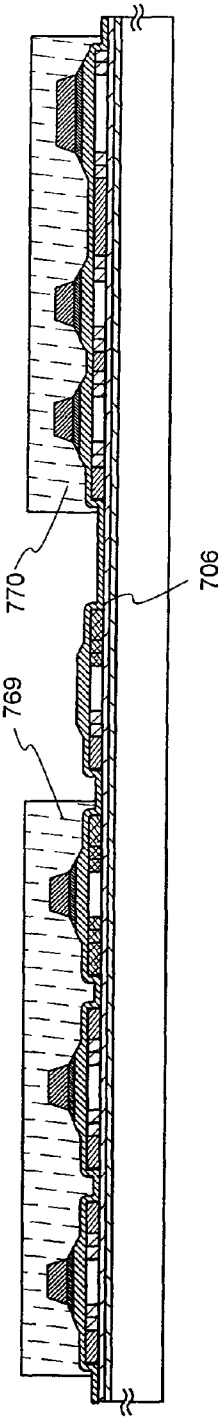
FIG. 12A
FIG. 12B
FIG. 12C

MOBILE PHONE

BACKGROUND OF THE INVENTION

1. Field of the Invention

The present invention relates to a mobile information-communication device, or a mobile phone. In particular, the present invention relates to a mobile information-communication device which includes a display portion where an optical sensor is provided in each pixel, or a mobile phone which includes a display portion where an optical sensor is provided in each pixel.

2. Description of the Related Art

As mobile phones have higher performance, the convenience thereof has been improved. Higher definition of display portions, higher capacity of communication functions, smaller electronic components, and the like greatly affect higher performance of mobile phones and help the spread of mobile phones. In particular, higher performance of display portions has recently developed actively and has contributed to improvement in convenience for users.

Reference 1 (Japanese Published Patent Application No. 2002-33823) discloses the structure of a mobile phone which is a mobile information-communication device, where optical sensors are provided in a plurality of pixels of a display portion and an authentication system for reading individual information related to users to perform authentication is provided, as one proposal for higher performance of display portions.

As for mobile phones, multifunctional models having an image function of receiving television broadcasts to display images, a calling function using communication through base stations of mobile phones, and a function of transmitting and receiving e-mail or the like through the Internet, have developed and have widely spread. On the other hand, in actual conditions, switching of functions of mobile phones is performed by touching operation buttons provided for the mobile phones by the users of the mobile phones or reading of external light by optical sensors provided in a display portion. However, the switching of functions of mobile phones by touching operation buttons or a display portion in which optical sensors are provided by users in each case makes operations complicated and hampers convenience.

Further, depending on functions of mobile phones to be used and operating methods of the mobile phones, by optimizing the size or arrangement of operation buttons and a display portion in which optical sensors are provided, operability can be improved. However, the operation buttons are mounted on the mobile phones, so that the size or arrangement cannot be optimized. Furthermore, in a touch-panel type display portion in which optical sensors are provided, operations by the users are needed to switch the arrangement of input keys which are displayed on the display portion, so that convenience is hampered.

SUMMARY OF THE INVENTION

In view of the foregoing problems, the present invention provides a mobile phone which can be used without hampering convinience in a condition where functions of the mobile phone are switched. The present invention provides a mobile phone which optimizes the size or arrangement of input keys which are displayed on a display portion in which optical sensors are provided depending on functions of a mobile phone to be used and an operating method of the mobile phone, so that operability can be improved.

In accordance with one aspect of the present invention, the following objects are included: an optical sensor, a display element, a pixel circuit portion where a plurality of pixels having a plurality of transistors are arranged in matrix, an optical sensor control circuit which is connected to an optical sensor driver circuit for driving the optical sensor and reads a signal from the optical sensor, a display portion control circuit which is connected to a display element driver circuit for driving the display element and outputs an image signal for displaying an image on a display portion, a gradient detection portion for outputting a signal in accordance with the gradient of a mobile phone, and an arithmetic circuit for performing display in the pixel circuit portion by switching image signals output to the display portion control circuit with a signal from the gradient detection portion.

In addition, in accordance with another aspect of the present invention, the following objects are included: an optical sensor, a display element, a pixel circuit portion where a plurality of pixels having a plurality of transistors are arranged in matrix, an optical sensor control circuit which is connected to an optical sensor driver circuit for driving the optical sensor and reads a signal from the optical sensor, a display portion control circuit which is connected to a display element driver circuit for driving the display element and outputs an image signal for displaying an image on a display portion, a gradient detection portion for detecting whether the gradient of a mobile phone is longitudinal or lateral and outputting a signal in accordance with the gradient, and an arithmetic circuit for performing display in the pixel circuit portion by switching an image signal output to the display portion control circuit with the signal in accordance with the gradient.

Further, in accordance with another aspect of the present invention, the following objects are included: an optical sensor, a display element, a pixel circuit portion where a plurality of pixels having a plurality of transistors are arranged in matrix, an optical sensor control circuit which is connected to an optical sensor driver circuit for driving the optical sensor and reads a signal from the optical sensor, a display portion control circuit which is connected to a display element driver circuit for driving the display element and outputs an image signal for displaying an image on a display portion, a gradient detection portion for detecting whether the gradient of a mobile phone is in a first state, a second state, or a third state and outputting a signal in accordance with the gradient, and an arithmetic circuit for performing display in the pixel circuit portion by switching an image signal output to the display portion control circuit with the signal in accordance with the gradient.

According to the present invention, a mobile phone which can be used without hampering convinience in a condition where functions of the mobile phone are switched can be provided. Further, a mobile phone which optimizes the size or arrangement of input keys which are displayed on a display portion in which optical sensors are provided depending on functions of a mobile phone to be used and an operating method of the mobile phone, so that operability can be improved, can be provided.

BRIEF DESCRIPTION OF THE DRAWINGS

In the accompanying drawings:

FIG. 1 is a block diagram for illustrating Embodiment Mode 1;

FIGS. 12A to 12C are cross-sectional views for illustrating Embodiment Mode 3;

DETAILED DESCRIPTION OF THE INVENTION

Figure 2A:
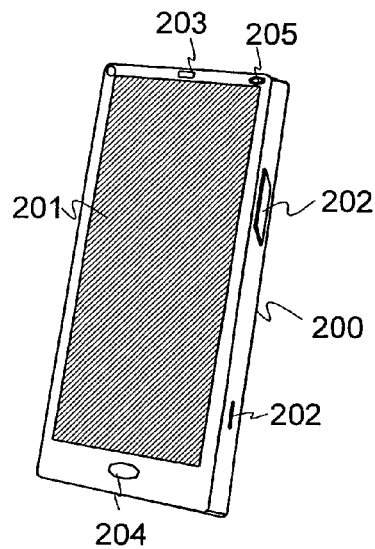
FIGS. 2A to 2D are diagrams for illustrating Embodiment Mode 1.

Hereinafter, embodiment modes of the present invention will be described with reference to the drawings. Note that the present invention can be implemented in various different ways and it will be readily appreciated by those skilled in the art that various changes and modifications are possible without departing from the spirit and the scope of the present invention. Therefore, the present invention should not be construed as being limited to the following description of the embodiment modes. Note that in all the drawings for describing the embodiment modes, like portions or portions having similar functions are denoted by the same reference numerals, and description thereof is not repeated.

Embodiment Mode 1

In this embodiment mode, the structures and functions of a mobile phone are described with reference to a block diagram and the like. Note that a mobile phone in this specification refers to a mobile information-communication device which has an image function of, for example, receiving television broadcasts to display images, a calling function using communication through base stations of the mobile phone, a function of transmitting and receiving e-mail or the like through the Internet, or the like. Note that the number of functions of a mobile phone may be plural, and the functions are not limited to the above functions.

FIG. 1 is a block diagram of a mobile phone which is described in this embodiment mode. The mobile phone shown in FIG. 1 includes a pixel circuit portion 101, a display element driver circuit 102, an optical sensor driver circuit 103, a display portion control circuit 104, an optical sensor control circuit 105, a gradient detection portion 106, an arithmetic circuit 107, a signal transmission/reception portion 108, an external input/output portion 109, and a memory portion 113.

In FIG. 1, a plurality of pixels 110 are provided in the pixel circuit portion 101, and a display element 111 and an optical sensor 112 are provided in each of the plurality of pixels. The display element driver circuit 102 includes a data line driver circuit and a scan line driver circuit (both are not shown) and controls the display elements 111 in the pixel circuit portion 101. The optical sensor driver circuit 103 includes an optical sensor signal line driver circuit and an optical sensor scan line driver circuit (both are not shown), controls the optical sensors 112 in the pixel circuit, and detects signals from the optical sensors 112. The display portion control circuit 104 outputs image data or the like for performing display on the pixel circuit portion 101 to the display element driver circuit 102, based on signals from the arithmetic circuit 107. The optical sensor control circuit 105 outputs signals or the like for detecting external light by the optical sensors 112 provided in the pixel circuit portion 101 to the optical sensor driver circuit 103, based on signals from the arithmetic circuit 107, and encodes signals from the optical sensors 112, which are obtained in the optical sensor driver circuit 103, to output these signals to the arithmetic circuit 107. The gradient detection portion 106 detects the gradient of the mobile phone and outputs signals in accordance with the gradient of the mobile phone to the arithmetic circuit 107. The arithmetic circuit 107 writes or reads signals to or from the memory portion 113 based on signals from the gradient detection portion 106, and converts signals from the signal transmission/reception portion 108, the external input/output portion 109, and the optical sensor control circuit 105 in accordance with functions desired by a user to output these signals to the display portion control circuit 104, the signal transmission/reception portion 108, and the external input/output portion 109.

The signal transmission/reception portion 108 includes an antenna 114 and a transmission/reception circuit 115. The antenna 114 receives and transmits radio signals from and to the outside. Note that the antenna 114 may have a function of receiving radio signals related to moving images of television broadcasts or the like. The transmission/reception circuit 115 has a function of demodulating data signals of radio signals received by the antenna 114, a function of modulating data signals of radio signals transmitted from the antenna 114, and the like.

The external input/output portion 109 includes a speaker 116, a microphone 117, a sound processing circuit 118, an operation key 119, and an interface 120. The speaker 116 outputs sound based on data signals related to sound superimposed over the radio signals. The microphone 117 converts the sound of the user of the mobile phone into signals. The sound processing circuit 118 generates analog signals which are output to the speaker 116 and encodes signals based on the sound converted by the microphone 117, for example. In addition, the operation key 119 is operated by the user and converts the operation into electric signals and outputs the electric signals. Further, the interface 120 inputs and outputs signals between the sound processing circuit 118 and the operation key 119, and the arithmetic circuit 107.

In the memory portion 113, a program for processing signals output to the display portion control circuit 104 in the arithmetic circuit 107 based on signals from the gradient detection portion 106 and a program related to processing of signals which are input and output to and from the signal transmission/reception portion 108 and the external input/output portion 109 are stored. For example, the memory portion 113 includes a ROM (read only memory) 121 and a RAM (random access memory) 122.

Note that the above structures of the signal transmission/reception portion 108, the external input/output portion 109, and the memory portion 113 are shown as examples, and the present invention is not limited to the above structures.

Note that by forming the gradient detection portion 106 by using, for example, a gyroscope or a triaxial acceleration sensor, a desired function can be obtained. As a gyroscope, a mechanical gyroscope, a liquid gyroscope, or an optical gyroscope may be used.

Note that as the gradient detection portion 106 in the present invention, a smaller component for detecting gradients is preferably used particularly. In such a case, it is preferable to use a triaxial acceleration sensor using a MEMS technology because reduction in size of the mobile phone can also be achieved.

Note that although a structure where a gradient detection portion is provided is shown as the structure of the mobile phone of the present invention, a structure where a different sensor is provided may be used. As a sensor other than a sensor which detects gradients, a sensor which detects positions, magnetism, temperature, chemical substances, sound, radiations, or the like can be given. By including a plurality of sensors, a more multifunctional mobile phone can be provided. For example, in the case where a position sensor detects the fact that the mobile phone is in an area (an area around priority seats on a train) where a calling function is prohibited, a function of limiting part of the functions (the calling function) in accordance with the gradient of the mobile phone can be realized.

Next, the operations of the gradient detection portion 106 and the arithmetic circuit 107 with the structures described in FIG. 1 are described with reference to the appearance (perspective views and schematic views) of the mobile phone in FIGS. 2A to 2D, FIGS. 3A to 3D, FIGS. 4A to 4D, FIGS. 5A to 5C, FIGS. 6A to 6C, and FIGS. 7A and 7B. Note that the shape of the display portion of the mobile phone is described as a rectangular shape which has long sides and short sides in the case where a display surface is seen from the front. Note that although the shape of a housing in which the display portion of the mobile phone is stored is not limited to a rectangular shape in the case where the display surface is seen from the front, the shape of the housing is preferably a rectangular shape from the viewpoints of operability and reduction in size. Note that the corners of the housing of the mobile phone may have rounded shapes or chamfered shapes from the viewpoints of safety and durability.

FIG. 2A is a perspective view of a mobile phone. The mobile phone shown in FIG. 2A is described assuming that a user utilizes a calling function using communication through base stations of the mobile phone when the user uses the mobile phone. In the perspective view shown in FIG. 2A, a mobile phone 200 includes a display portion 201, an operation key 202, a speaker 203, a microphone 204, and an imaging lens 205. Note that a plurality of pixels are provided in the display portion 201 and a display element and an optical sensor are provided in each of the plurality of pixels, as described in FIG. 1.

Note that in this specification, an operation key refers to an object whose movable portion such as a push button is moved so that electric control is performed.

Figure 2B:
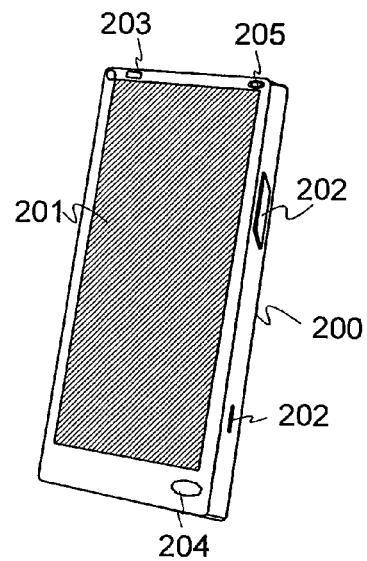

In addition, FIG. 2B is a perspective view of the mobile phone with a structure which is different from that of FIG. 2A. FIG. 2B differs from FIG. 2A in that the speaker 203 and the microphone 204 are provided diagonally in a rectangle in the case where a display surface is seen from the front. By providing the speaker 203 and the microphone 204 diagonally in the mobile phone, the speaker 203 and the microphone 204 can be provided so as to be separate from each other. Therefore, a problem in that a calling function is decreased because the speaker 203 or the microphone 204 is apart from the ear and mouth when the mobile phone is made smaller is solved, so that convenience in utilizing the calling function of the mobile phone can be improved.

In the case where the calling function of the mobile phone is utilized, the following functions are used in sequence by the user: 1) a function of selecting and specifying an intended party with an input key, 2) a function of inputting the telephone number of the intended party with the input key, and 3) a function of reading the user from notification from the intended party. The above functions 1) to 3) are used when the mobile phone is used by the user with the housing of the mobile phone set in a longitudinal direction, that is, with a gradient where a long-side direction of a rectangle is a perpendicular direction in the case where the display surface is seen from the front. When the functions are described with reference to a schematic view of a display surface of a mobile phone shown in FIG. 2C, display 251 of the intended party and the telephone number and display 252 of numbers and an input key for selection are provided in the display portion 201. The user who uses the calling function of the mobile phone selects the intended party and the telephone number through the display of the input key in accordance with the above functions 1) to 3) and talks on the phone.

Note that in this specification, the case where a mobile phone is in a longitudinal direction refers to the case where a mobile phone has a gradient where a long-side direction of a rectangle is a perpendicular direction in the case where a display surface is seen from the front. Further, the case where a mobile phone is in a lateral direction refers to the case where a mobile phone has a gradient where a long-side direction of a rectangle is a horizontal direction in the case where a display surface is seen from the front.

Note that in this specification, an input key refers to a region for operation, which is displayed on a display portion provided with an optical sensor. That is, the size or arrangement of an input key can be varied in accordance with display on the display portion.

Figure 2C:
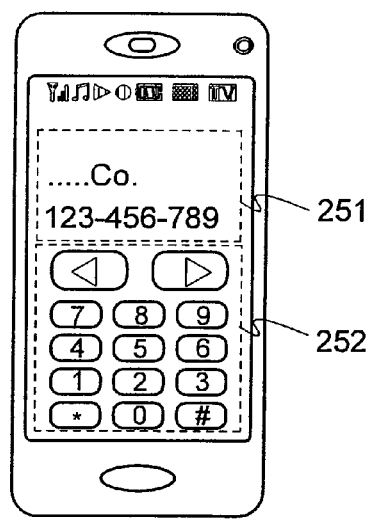

In the present invention, a gradient detection portion is provided inside the mobile phone; signals which are output from the arithmetic circuit to the display portion control circuit are switched by signals in accordance with the degree of the gradient of the mobile phone in the gradient detection portion; and display is performed on the display portion in which the pixel circuit portion is provided. That is, in the gradient detection portion, when the mobile phone detects the fact that the housing is in a longitudinal direction as shown in FIG. 2A, the arithmetic circuit performs processing so that display with the display element provided in each pixel is performed as shown in FIG. 2C and the kind, size, or arrangement of the input key can be varied by the optical sensor provided in each pixel. Therefore, the display region of the input key can be minimized in accordance with a function used by the user, so that the size and arrangement of the input key can be optimized.

Figure 2D:
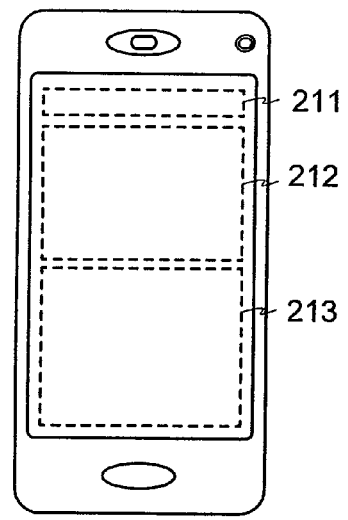

Note that in the schematic view in the case where the calling function of the mobile phone shown in FIG. 2C is utilized, the display 251 of the intended party and the telephone number and the display 252 of the numbers and the input key for selection are shown in the display portion 201. The schematic view in the case where the calling function of the mobile phone shown in FIG. 2C is utilized can be described by dividing the display portion of the mobile phone into a segment display region 211, an image display region 212, and an input key display region 213, as shown in FIG. 2D. The present invention is not limited to the above display region; however, by using a structure where a display element and an optical sensor are provided in each pixel and a structure where a gradient detection portion is provided, the display region can be optimized depending on functions in accordance with usability for the user. Note that although the example in which the segment display region 211 is displayed taking usability of the mobile phone into consideration is shown in FIG. 2C and FIG. 2D, the calling function can be used without particularly displaying the segment display region 211.

Note that although the structure where the mobile phone 200 includes the imaging lens 205 is shown in FIG. 2A, a structure where the mobile phone 200 does not include the imaging lens 205 may be used. Note that when information related to the gradient of the mobile phone is obtained by performing image processing of an image taken by a camera function of the mobile phone 200, in addition to the signals in accordance with the degree of the gradient of the mobile phone in the gradient detection portion, a function of converting the functions of the mobile phone with fewer malfunctions can be realized, which is preferable.

In FIG. 2A, an example of a function in the case where the mobile phone is used in a longitudinal direction by the user is shown assuming that the calling function of the mobile phone is utilized. In each of FIGS. 3A to 3D, FIGS. 4A to 4D, FIGS. 5A to 5C, FIGS. 6A to 6C, and FIGS. 7A and 7B, an example of a function in the case where the mobile phone is utilized by the user with a gradient where a short-side direction of a rectangle is a longitudinal direction in the case where the display surface is seen from the front, that is, in a lateral direction and with a long-side direction fixed and a short-side direction inclined, is described.

Figure 3A:
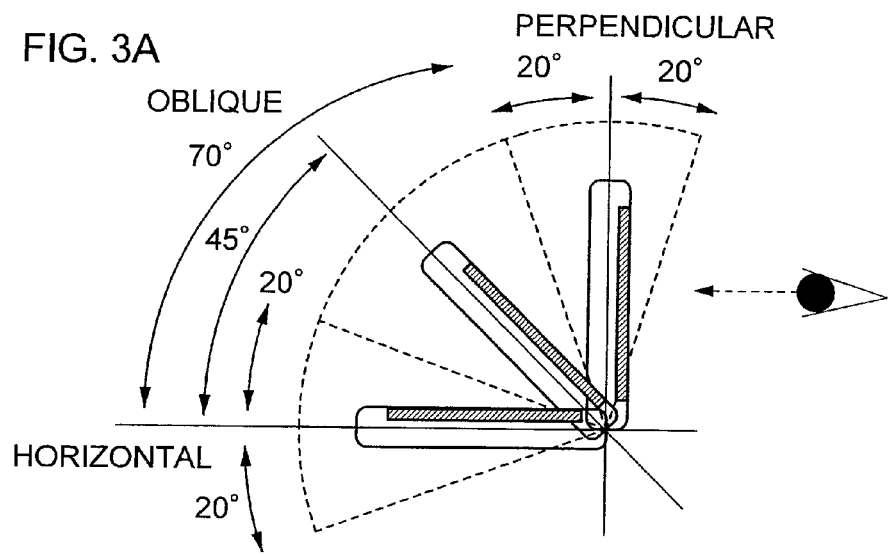
FIGS. 3A to 3D are diagrams for illustrating Embodiment Mode 1.

First, in FIGS. 3A to 3D, a schematic diagram and perspective views of the mobile phone when the mobile phone is utilized with a gradient where a short-side direction of a rectangle is a longitudinal direction in the case where the display surface is seen from the front and with a long-side direction fixed and a short-side direction inclined, are described. FIG. 3A shows examples of gradients of the short-side direction of the rectangle in the case where the display surface of the mobile phone is seen from the front. FIG. 3A shows switching of functions of the mobile phone when the short-side direction of the rectangle is a substantially perpendicular direction (also referred to as a perpendicular direction), an oblique direction, or a substantially horizontal direction (also referred to as a horizontal direction) in the case where the display surface of the mobile phone is seen from the front. That is, switching of the functions of the mobile phone when the mobile phone is in a lateral direction is described.

Figure 3B:
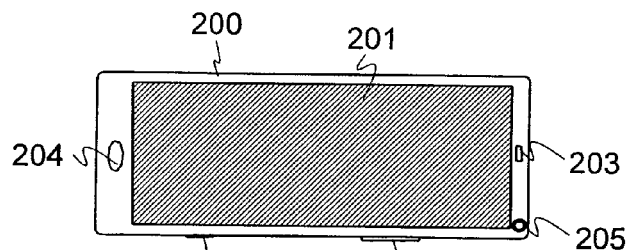
Figure 3C:
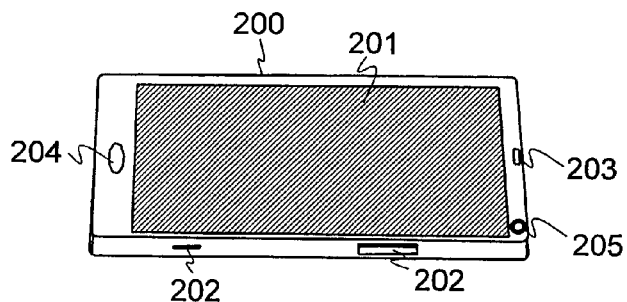
Figure 3D:
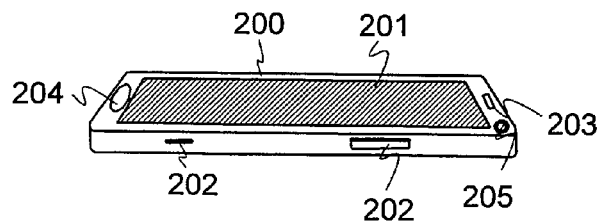

FIG. 3B is a perspective view of the mobile phone when the short side of the rectangle is a substantially perpendicular direction in the case where the mobile phone shown in FIG. 3A is seen from the front. FIG. 3C is a perspective view of the mobile phone when the short-side direction of the rectangle is an oblique direction in the case where the mobile phone shown in FIG. 3A is seen from the front. FIG. 3D is a perspective view of the mobile phone when the short-side direction of the rectangle is a substantially horizontal direction in the case where the mobile phone shown in FIG. 3A is seen from the front. Note that a substantially perpendicular direction refers to a direction where a short-side direction of a rectangle is inclined in the range of −20° to 20° from a perpendicular direction in the case where the mobile phone is seen from the front, as shown in FIG. 3A, for example. In addition, an oblique direction refers to a direction where a short-side direction of a rectangle is inclined in the range of −25° to 25° from a 45° direction with respect to a horizontal direction or a perpendicular direction in the case where the mobile phone is seen from the front, as shown in FIG. 3A, for example. Further, a substantially horizontal direction refers to a direction where a short-side direction of a rectangle is inclined in the range of −20° to 20° from a horizontal direction in the case where the mobile phone is seen from the front, as shown in FIG. 3A, for example. Note that with respect to the signals in accordance with the degree of the gradient of the mobile phone in the gradient detection portion, more functions may be set separately. In this embodiment mode, examples of switching of the functions in accordance with the function used by the user when the short-side direction of the rectangle is a longitudinal direction in the case where the display surface of the mobile phone is seen from the front, a long-side direction is fixed, and the short-side direction is inclined are described by separately describing the case where the short side of the rectangle is inclined in a substantially perpendicular direction, the case where the short side of the rectangle is inclined in an oblique direction, and the case where the short side of the rectangle is inclined in a substantially horizontal direction. Note that the reference numerals used in the perspective views of the mobile phone shown in FIGS. 3B to 3D are the same as the reference numerals used for the mobile phone shown in FIG. 2A, so that description thereof is omitted.

Note that in this specification, the state of the mobile phone in FIG. 3B is referred to as a first state (or a lateral and perpendicular state); the state of the mobile phone in FIG. 3C is referred to as a second state (or a lateral and oblique state); and the state of the mobile phone in FIG. 3D is referred to as a third state (or a lateral and horizontal state). Note that the present invention is not limited to the states in FIGS. 3B to 3D, and any state may be used as long as functions are switched in accordance with a gradient which is suitable for the function of the mobile phone.

Note that in this specification, terms such as "first", "second", "third", and "$N^{th}$" (N is a natural number) are used in order to avoid confusion among components, and the terms do not limit the components numerically.

Figure 4A:
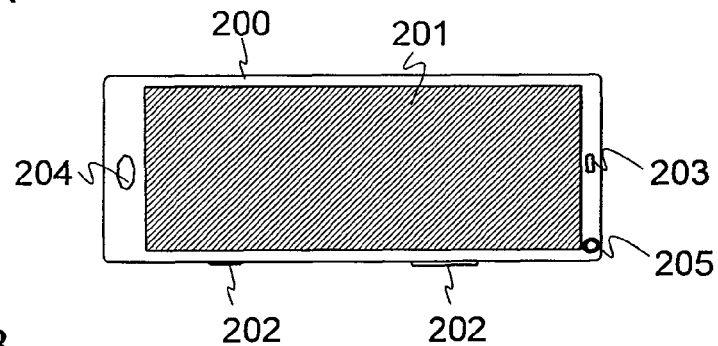
FIGS. 4A to 4D are diagrams for illustrating Embodiment Mode 1.

Functions of the mobile phone in the first state shown in FIG. 3B are described in FIGS. 4A to 4D. The mobile phone shown in FIG. 4A is described assuming that the mobile phone receives television broadcasts to display images or an image function is used based on moving image display stored in the memory portion when the user uses the mobile phone. In the perspective view shown in FIG. 4A, the reference numerals used for the mobile phone shown in FIG. 2A are used in a manner similar to that of FIG. 3B. A plurality of pixels are provided in the display portion 201 and a display element and an optical sensor are provided in each of the plurality of pixels, as described in FIG. 1.

In the case of utilizing the image function on the mobile phone, there is a function of displaying necessary images in a user-friendly way as a function used by the user. The above function is used by the user with the housing of the mobile phone set in a longitudinal direction, that is, with a gradient where a short-side direction of a rectangle is a longitudinal direction (a perpendicular direction) in the case where the display surface is seen from the front. When the function is described with reference to a schematic view of a display surface of the mobile phone shown in FIG. 4B, display 253 of a desired image (e.g., an image of a television broadcast) is provided in the display portion 201. The user who uses the image function on the mobile phone can watch images of television broadcasts by using most of the portions of the display surface.

In the present invention, a gradient detection portion is provided inside the mobile phone, signals which are output from the arithmetic circuit to the display portion control circuit are switched by signals in accordance with the degree of the gradient of the mobile phone in the gradient detection portion, and display is performed on the display portion in which the pixel circuit portion is provided. That is, in the gradient detection portion, when the mobile phone detects the gradient of the housing in the case of being provided with the housing as shown in FIG. 4A, the arithmetic circuit performs processing so that display with the display element provided in each pixel is performed as shown in FIG. 4B; therefore, the user can watch images by using most of the portions of the display surface with the display element provided in each pixel.

Figure 4B:
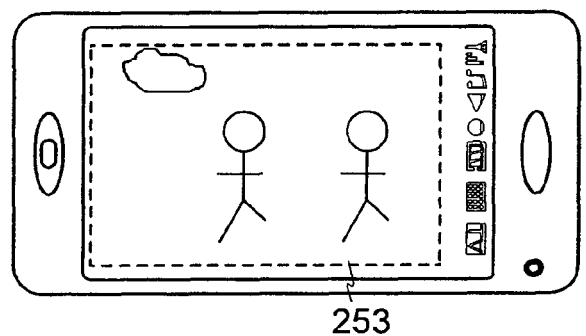
Figure 4C:
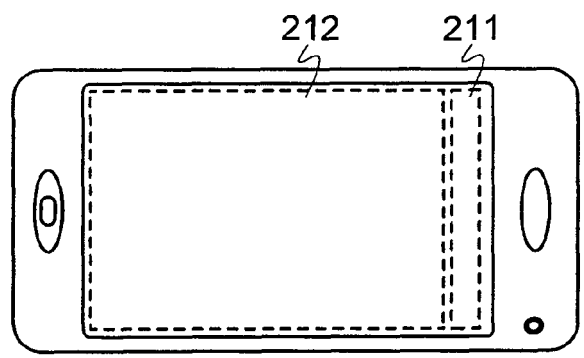
Figure 4D:
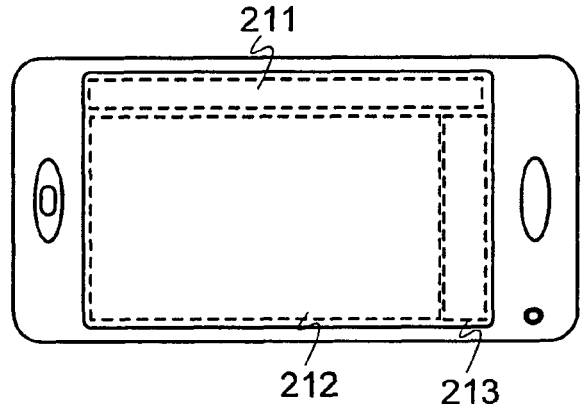

Note that in the schematic view in the case where the image function on the mobile phone shown in FIG. 4B is utilized, the display 252 of the desired image is shown in the display portion 201. The schematic view in the case where the image function on the mobile phone shown in FIG. 4B is utilized can be described by dividing the display portion of the mobile phone into the segment display region 211 and the image display region 212, as shown in FIG. 4C. Alternatively, the schematic view in the case where the image function on the mobile phone shown in FIG. 4B is utilized can be described by dividing the display portion of the mobile phone into the segment display region 211, the image display region 212, and the input key display region 213, as shown in FIG. 4D. When the user watches images of television broadcasts on the mobile phone, selection of broadcast stations is performed. Thus, it is preferable to provide the input key display region 213 because convenience can be improved. The present invention is not limited to the above display region; however, by using a structure where a display element and an optical sensor are provided in each pixel and a structure where a gradient detection portion is provided, the display region can be optimized depending on functions in accordance with usability for the user. Note that although the example in which the segment display region 211 is displayed taking usability of the mobile phone into consideration is shown in FIG. 4B to FIG. 4D, the image function can be used without particularly displaying the segment display region 211.

Note that a segment display region refers to a region for displaying signs or the like which show a reception condition of radio signals, capacity of a battery, and a function displayed by a mobile phone. Alternatively, a segment display region may refer to a region for notifying simple character information with a telop or the like.

Figure 5A:
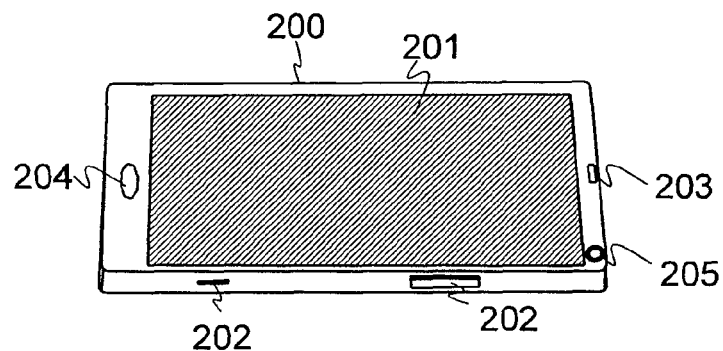
FIGS. 5A to 5C are diagrams for illustrating Embodiment Mode 1.
Figure 5B:
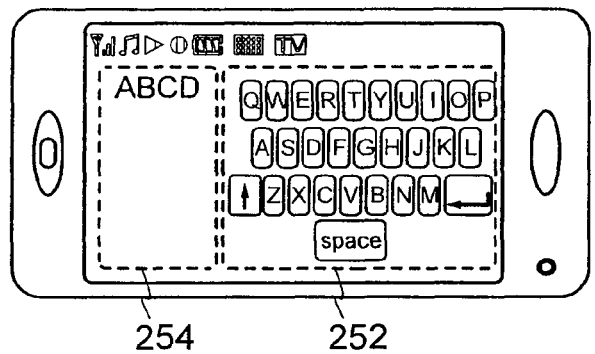
Figure 5C:
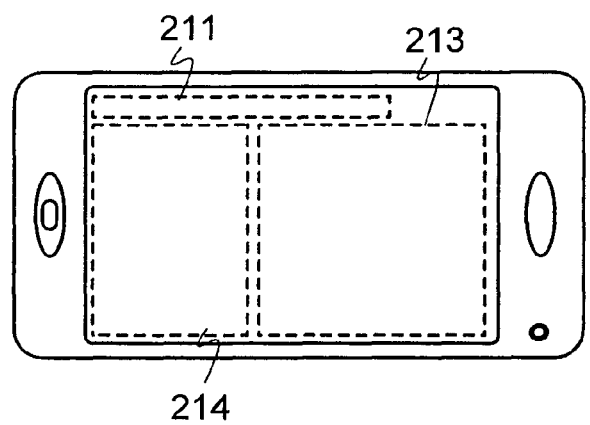

Functions of the mobile phone in the second state shown in FIG. 3C are described in FIGS. 5A to 5C. The mobile phone shown in FIG. 5A is described assuming that a function of transmitting and receiving e-mail or the like through the Internet, in particular, a function of editing text of e-mail or the like (hereinafter referred to as an editing function) is used when the user uses the mobile phone. In the perspective view shown in FIG. 5A, the reference numerals used for the mobile phone shown in FIG. 2A are used in a manner similar to that of FIG. 3C. A plurality of pixels are provided in the display portion 201 and a display element and an optical sensor are provided in each of the plurality of pixels, as described in FIG. 1.

In the case of utilizing the editing function on the mobile phone, a function of inputting desired characters is used as a function used by the user. As shown in FIG. 5A, the above function is used by the user with the housing of the mobile phone set in a lateral and inclined in an oblique direction, that is, with a gradient where a short-side direction of a rectangle is a longitudinal direction in the case where the display surface is seen from the front and with a long-side direction fixed and a short-side direction inclined. When the function is described with reference to a schematic view of a display surface of the mobile phone shown in FIG. 5B, display 254 of input characters and the display 252 of a character input key are provided in the display portion 201. The user who uses the editing function on the mobile phone can select desired characters with the character input key and can input characters while seeing display of the input characters.

In the present invention, a gradient detection portion is provided inside the mobile phone; signals which are output from the arithmetic circuit to the display portion control circuit are switched by signals in accordance with the degree of the gradient of the mobile phone in the gradient detection portion; and display is performed on the display portion in which the pixel circuit portion is provided. That is, in the gradient detection portion, when the mobile phone detects the fact that the housing is in the state where a short-side direction of a rectangle is a longitudinal direction in the case where the display surface of the mobile phone is seen from the front, a long-side direction is fixed, and the short-side direction is inclined as shown in FIG. 5B, the arithmetic circuit performs processing so that display with the display element provided in each pixel is performed as shown in FIG. 5B, and the kind, size, or arrangement of the input key can be varied by the optical sensor provided in each pixel. Therefore, the display region of the input key can be minimized in accordance with the function used by the user, so that the size and arrangement of the input key can be optimized.

In particular, in the case of utilizing the editing function on the mobile phone, time for inputting characters can be shortened by providing the input key with QWERTY layout, as shown in FIG. 5B. Note that the layout of the input key is not limited to QWERTY layout, and Dvorak layout or given layout of the input key by the user can be used in accordance with a language or an intended purpose. As described above, in the mobile phone of the present invention, the display element and the optical sensor are provided in the display portion, the arithmetic circuit performs processing in accordance with signals from the gradient detection portion, and the kind, size, or arrangement of the input key can be varied by the optical sensor provided in each pixel. Therefore, unlike an input key which has predetermined kind, size, or arrangement, such as a built-in operation key, convenience for users can be improved.

Note that in the schematic view in the case where the editing function of the mobile phone shown in FIG. 5B is utilized, the display 254 of the input characters and the display 252 of the character input key are shown in the display portion 201. The schematic view in the case where the editing function of the mobile phone shown in FIG. 5B is utilized can be described by dividing the display portion of the mobile phone into the segment display region 211, the input key display region 213, and a character display region 214, as shown in FIG. 5C. The present invention is not limited to the above display region; however, by using a structure where a display element and an optical sensor are provided in each pixel and a structure where a gradient detection portion is provided, the display region can be optimized depending on functions in accordance with usability for the user. Note that although the example in which the segment display region 211 is displayed taking usability of the mobile phone into consideration is shown in FIG. 5B and FIG. 5C, the editing function can be used without particularly displaying the segment display region 211.

Figure 6A:
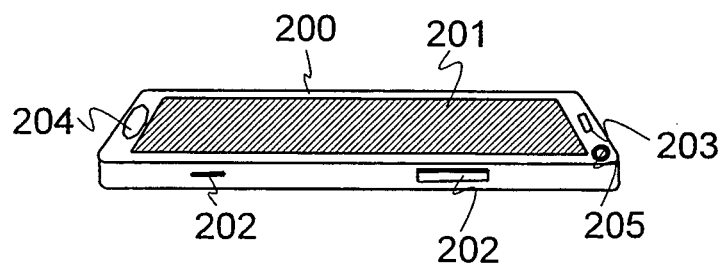
FIGS. 6A to 6C are diagrams for illustrating Embodiment Mode 1.
Figure 6B:
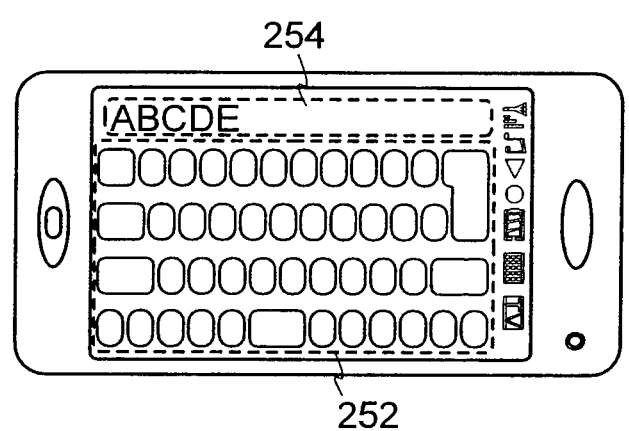
Figure 6C:
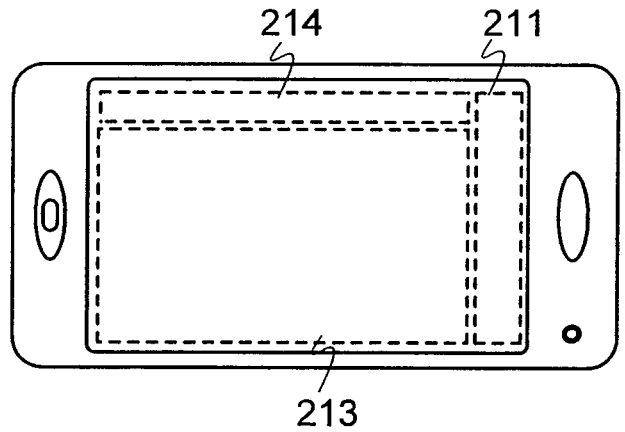

Functions of the mobile phone in the third state shown in FIG. 3D are described in FIGS. 6A to 6C. The mobile phone shown in FIG. 6A is described assuming that the user uses the editing function, though it has been described in FIG. 5A. In the perspective view shown in FIG. 6A, the reference numerals used for the mobile phone shown in FIG. 2A are used in a manner similar to that of FIG. 3D. A plurality of pixels are provided in the display portion 201 and a display element and an optical sensor are provided in each of the plurality of pixels, as described in FIG. 1.

In the case of utilizing the editing function on the mobile phone, a function of inputting desired characters is used as a function used by the user. The mobile phone utilizing the editing function, which is shown in FIGS. 6A to 6C, differs from the mobile phone utilizing the editing function, which is described in FIGS. 5A to 5C, in that the convenience of the function of inputting desired characters is improved. That is, a function of displaying a character input key by using most of the portions of the display portion is described. As shown in FIG. 6A, the above function is used by the user with the housing of the mobile phone set in a lateral direction, that is, with a gradient where a short-side direction of a rectangle is a longitudinal direction in the case where the display surface is seen from the front and with a long-side direction fixed and the short-side direction inclined horizontally. When the function is described with reference to a schematic view of a display surface of the mobile phone shown in FIG. 6B, the display 254 of input characters and the display 252 of the character input key are provided in the display portion 201. The user who uses the editing function on the mobile phone can select desired characters with the character input key and can input characters while seeing display of the input characters.

In the present invention, a gradient detection portion is provided inside the mobile phone; signals which are output from the arithmetic circuit to the display portion control circuit are switched by signals in accordance with the degree of the gradient of the mobile phone in the gradient detection portion; and display is performed on the display portion in which the pixel circuit portion is provided. That is, in the gradient detection portion, when the mobile phone detects the fact that the housing is in the state where a short-side direction of a rectangle is a longitudinal direction in the case where the display surface is seen from the front, a long-side direction is fixed, and the short-side direction is inclined horizontally as shown in FIG. 6B, the arithmetic circuit performs processing so that display with the display element provided in each pixel is performed as shown in FIG. 6B, and the kind, size, or arrangement of the input key can be varied by the optical sensor provided in each pixel. Therefore, the display region of the input key can be minimized in accordance with the function used by the user, so that the size and arrangement of the input key can be optimized.

In the case of utilizing the editing function on the mobile phone, as described in FIG. 5B, time for inputting characters can be shortened by providing the input key with QWERTY layout as shown in FIG. 6B. In particular, in the mobile phone shown in FIG. 6B, the mobile phone is in the state where a short-side direction of a rectangle is a longitudinal direction (a perpendicular direction) in the case where the display surface is seen from the front, a long-side direction is fixed, and the short-side direction is inclined horizontally, and the size of the input key can be made larger. Therefore, characters can be input in a manner similar to that of a keyboard of a laptop computer or a desktop computer, so that time for inputting characters by the user can be considerably shortened. Note that the layout of the input key is not limited to QWERTY layout, and Dvorak layout or given layout of the input key by the user can be used in accordance with a language or an intended purpose. As described above, in the mobile phone of the present invention, the display element and the optical sensor are provided in the display portion, the arithmetic circuit performs processing in accordance with signals from the gradient detection portion, and the kind, size, or arrangement of the input key can be varied by the optical sensor provided in each pixel. Therefore, unlike an input key which has predetermined kind, size, or arrangement, such as a built-in operation key, convenience for users can be improved.

Note that in the schematic view in the case where the editing function of the mobile phone shown in FIG. 6B is utilized, the display 254 of the input characters and the display 252 of the character input key are shown in the display portion 201. The schematic view in the case where the editing function of the mobile phone shown in FIG. 6B is utilized can be described by dividing the display portion of the mobile phone into the segment display region 211, the input key display region 213, and the character display region 214, as shown in FIG. 6C. The present invention is not limited to the above display region; however, by using a structure where a display element and an optical sensor are provided in each pixel and a structure where a gradient detection portion is provided, the display region can be optimized depending on functions in accordance with usability for the user. Note that although the example in which the segment display region 211 is displayed taking usability of the mobile phone into consideration is shown in FIG. 6B and FIG. 6C, the editing function can be used without particularly displaying the segment display region 211.

Figure 7A:
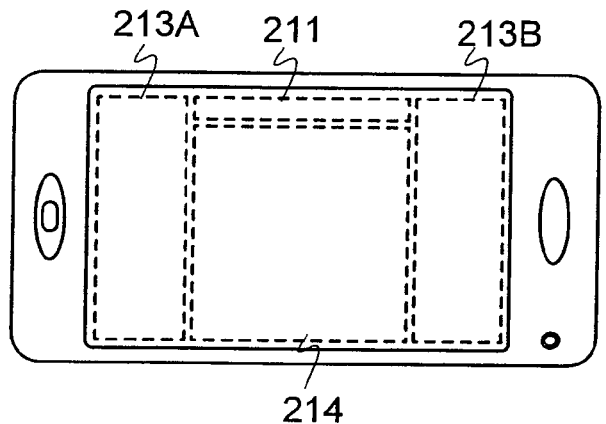
FIGS. 7A and 7B are diagrams for illustrating Embodiment Mode 1.
Figure 7B:
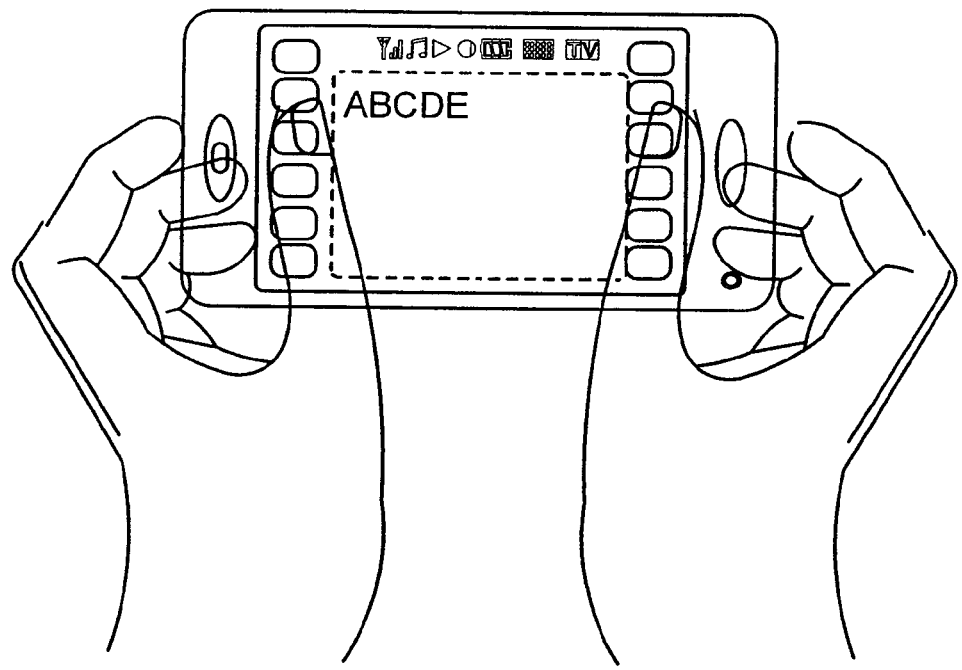

Note that although the input key display region 213 for displaying the character input key is one region in the case of realizing the editing function on the mobile phone as shown in FIG. 5C and FIG. 6C, a plurality of input key display regions may be provided on the display surface, such as a first input key display region 213A and a second input key display region 213B, as shown in FIG. 7A. In the case of displaying a plurality of input key display regions on the display surface, the plurality of input key display regions are preferably interposed between the segment display region 211 and the character display region 214, as shown in FIG. 7A. By providing the first input key display region 213A and the second input key display region 213B at opposite ends of the display surface as shown in FIG. 7A, the character input keys can be operated while the housing is held by both hands as shown in FIG. 7B, so that time for inputting characters can be shortened with the housing held up.

As described above, in the mobile phone of the present invention, the display element and the optical sensor are provided in each of the plurality of pixels; and functions used in the mobile phone, in particular, functions related to display and input on the display surface are switched by the arithmetic circuit in accordance with signals from the gradient detection portion. Therefore, a mobile phone which can be used without hampering convinence can be provided. Further, a mobile phone which optimizes the size or arrangement of the display portion in which optical sensors are provided depending on functions of a mobile phone to be used and an operating method of the mobile phone, so that operability can be improved.

Note that this embodiment mode can be implemented in combination with any technical component in other embodiment modes in this specification.

Embodiment Mode 2

Figure 8:
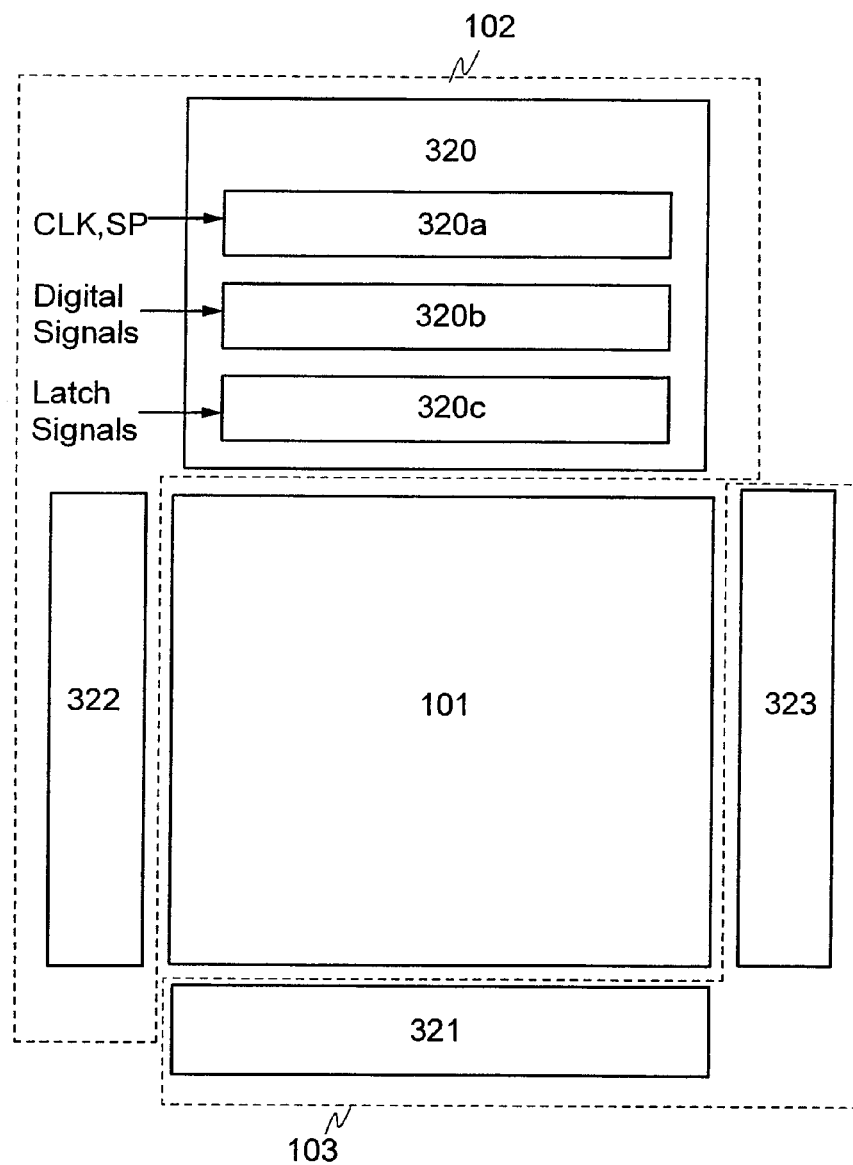
FIG. 8 is a block diagram for illustrating Embodiment Mode 2.

In this embodiment mode, examples of the structures of the pixel circuit portion 101, the display element driver circuit 102, and the optical sensor driver circuit 103 which are provided around the display portion of the mobile phone used in the present invention are described. FIG. 8 is a block diagram of the pixel circuit portion 101, the display element driver circuit 102, and the optical sensor driver circuit 103. In FIG. 8, the display element driver circuit 102 includes a data line driver circuit 320 and a scan line driver circuit 322. Further, the optical sensor driver circuit 103 includes an optical sensor signal line driver circuit 321 and an optical sensor scan line driver circuit 323 that control the driving of a reset transistor, a buffer transistor, and a selection transistor provided in each pixel.

The data line driver circuit 320 includes a shift register 320a, a latch (A) 320b, and a latch (B) 320c. In the data line driver circuit 320, a clock signal (CLK) and a start pulse (SP) are input to the shift register 320a. The shift register 320a sequentially generates timing signals based on the clock signal (CLK) and the start pulse (SP) and supplies the timing signals to a circuit in the subsequent stage.

Note that amplitude voltage of the timing signals from the shift register 320a may be amplified by a buffer or the like (not shown) and the amplified timing signals may be sequentially supplied to the circuit in the subsequent stage. Since many circuits or elements are connected to wirings to which the timing signals are supplied, load capacitance (parasitic capacitance) is large. In order to prevent generation of "delay" in rising or falling of the timing signals due to this large load capacitance, the buffer is provided.

Figure 9A:
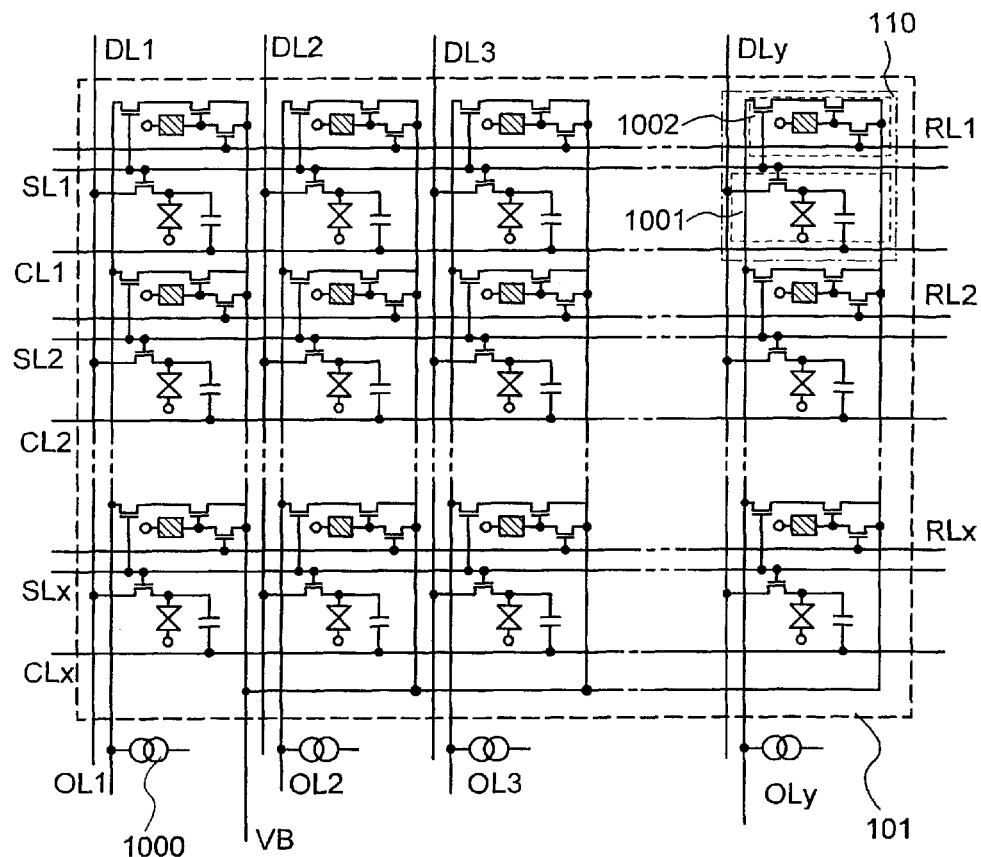
FIGS. 9A and 9B are circuit diagrams for illustrating Embodiment Mode 2.

FIG. 9A shows an example of a circuit diagram of the pixel circuit portion 101. The pixel circuit portion 101 includes signal lines DL1 to DLy, scan lines SL1 to SLx, capacitor lines CL1 to CLx, reset scan lines RL1 to RLx, optical sensor output wirings OL1 to OLy, and an optical sensor power supply line VB.

The pixel circuit portion 101 includes the plurality of pixels 110. Each of the plurality of pixels 110 includes any one of the signal lines DL1 to DLy, any one of the scan lines SL1 to SLx, any one of the capacitor lines CL1 to CLx, any one of the reset scan lines RL1 to RLx, any one of the optical sensor output wirings OL1 to OLy, and the optical sensor power supply line VB. Each of the optical sensor output wirings OL1 to OLy is connected to a constant current power source 1000. Further, each of the plurality of pixels 110 includes a display element portion 1001 having a display element and an optical sensor portion 1002 having an optical sensor.

Figure 9B:
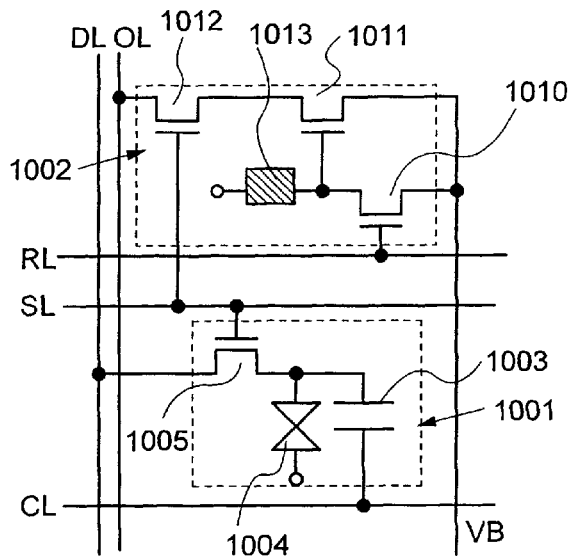

FIG. 9B shows the structures of the display element portion 1001 and the optical sensor portion 1002. The display element portion 1001 includes a pixel transistor 1005, a storage capacitor 1003, and a liquid crystal element 1004. The optical sensor portion 1002 includes a reset transistor 1010, a buffer transistor 1011, a selection transistor 1012, and a photodiode 1013. Note that a signal line DL refers to any one of the signal lines DL1 to DLy. In addition, a scan line SL refers to any one of the scan lines SL1 to SLx. Further, a capacitor line CL refers to any one of the capacitor lines CL1 to CLx. Furthermore, a reset scan line RL refers to any one of the reset scan lines RL1 to RLx. Moreover, an optical sensor output wiring OL refers to any one of the optical sensor output wirings OL1 to OLy.

Note that although a liquid crystal element is described as an example of a display element in this embodiment mode, the present invention is not limited to this. An EL element (an organic EL element, an inorganic EL element, or an EL element containing an organic material and an inorganic material), or an electrophoretic element may be used.

Note that in this embodiment mode, a photodiode is described as an example of an optical sensor. Further, a connection between the photodiode and a transistor for reading light incident on the photodiode is described as an example, and any circuit structure may be used as long as it is a circuit structure for outputting electric signals obtained by the incidence of light on the photodiode.

The liquid crystal element 1004 includes a pixel electrode, a counter electrode, and a liquid crystal layer provided therebetween. A gate of the pixel transistor 1005 is connected to the scan line SL (any one of SL1 to SLx). In addition, one of terminals which correspond to a source and a drain of the pixel transistor 1005 is connected to the signal line DL, and the other thereof is connected to the liquid crystal element 1004 and the storage capacitor 1003.

A gate of the reset transistor 1010 is connected to the reset scan line RL (any one of RL1 to RLx). A terminal which corresponds to a source of the reset transistor 1010 is connected to the optical sensor power supply line VB. The optical sensor power supply line VB is always kept at a certain potential (a reference potential). A terminal which corresponds to a drain of the reset transistor 1010 is connected to the photodiode 1013 and a terminal which corresponds to a gate of the buffer transistor 1011.

Although not shown, the photodiode 1013 includes a cathode electrode, an anode electrode, and a photoelectric conversion layer provided therebetween. The drain of the reset transistor 1010 is also connected to the anode electrode or the cathode electrode of the photodiode 1013.

A terminal which corresponds to a drain of the buffer transistor 1011 is connected to the optical sensor power supply line VB and is always kept at a certain reference potential. In addition, a terminal which corresponds to a source of the buffer transistor 1011 is connected to one of a source and a drain of the selection transistor 1012.

A gate of the selection transistor 1012 is connected to the scan line SL (any one of SL1 to SLx). In addition, one of terminals which correspond to the source and the drain of the selection transistor 1012 is connected to the source of the buffer transistor 1011 as described above, and the other thereof is connected to the optical sensor output wiring OL (any one of OL1 to OLy). Each of the optical sensor output wirings (OL1 to OLy) is connected to the constant current power source 1000 and is always supplied with certain current.

Although the case where the pixel transistor 1005 and the selection transistor 1012 have the same polarity is described in this embodiment mode, the structure of the pixel circuit portion 1001 is not limited to this.

As described in this embodiment mode, in the mobile phone of the present invention, the display element and the optical sensor are provided in each of the plurality of pixels. Further, as described in Embodiment Mode 1, functions used in the mobile phone, in particular, functions related to display and input on the display surface are switched by an arithmetic circuit in accordance with signals from a gradient detection portion. Therefore, a mobile phone which can be used without hampering convinience can be provided. Further, a mobile phone which optimizes the size or arrangement of the display portion in which optical sensors are provided depending on functions of a mobile phone to be used and an operating method of the mobile phone, so that operability can be improved.

Note that this embodiment mode can be implemented in combination with any technical component in other embodiment modes in this specification.

Embodiment Mode 3

Figure 10A:
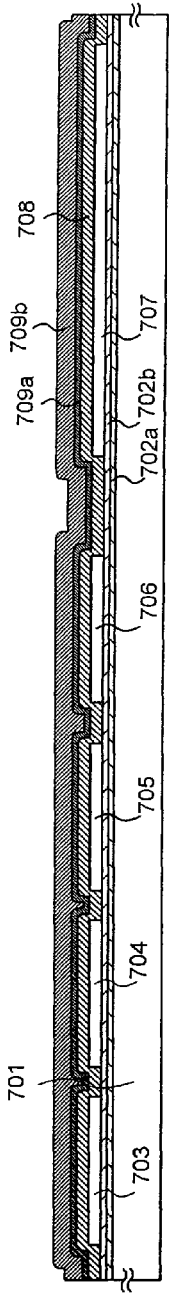
FIGS. 10A to 10D are cross-sectional views for illustrating Embodiment Mode 3.

In this embodiment mode, a method for manufacturing each transistor included in the pixel circuit portion over a substrate having an insulating surface is described in detail. First, as shown in FIG. 10A, a first insulating film 702a and a second insulating film 702b are formed over a substrate 701. A first semiconductor layer 703, a second semiconductor layer 704, a third semiconductor layer 705, a fourth semiconductor layer 706, and a fifth semiconductor layer 707 are formed over the second insulating film 702b.

As the substrate 701, a glass substrate, a quartz substrate, a ceramic substrate, a plastic substrate, a semiconductor substrate, a sapphire substrate, a metal substrate, or the like can be used. The semiconductor layers can be formed using single crystal silicon, germanium, a compound semiconductor such as gallium arsenide or indium phosphide, or the like.

Further, the substrate 701 is attached to the first semiconductor layer 703, the second semiconductor layer 704, the third semiconductor layer 705, the fourth semiconductor layer 706, and the fifth semiconductor layer 707 with the first insulating film 702a and the second insulating film 702b interposed therebetween. An example of attaching the substrate to the semiconductor layers is described with reference to FIGS. 11A to 11F. FIGS. 11A to 11F are cross-sectional views showing steps of attaching the substrate to the semiconductor layers in this embodiment mode. Note that in this embodiment mode, size which is different from actual size is used in FIGS. 11A to 11F for convenience.

Figure 10B:
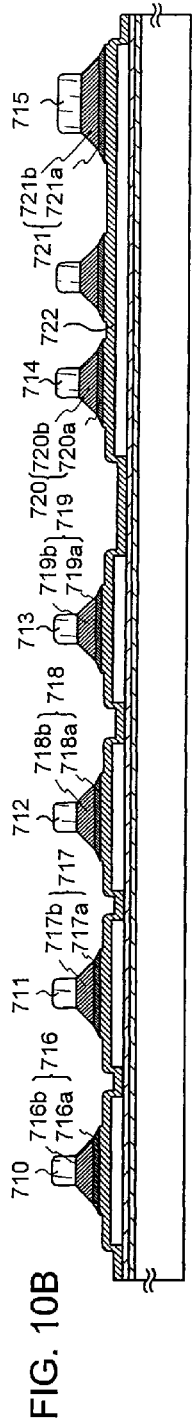
Figure 10C:
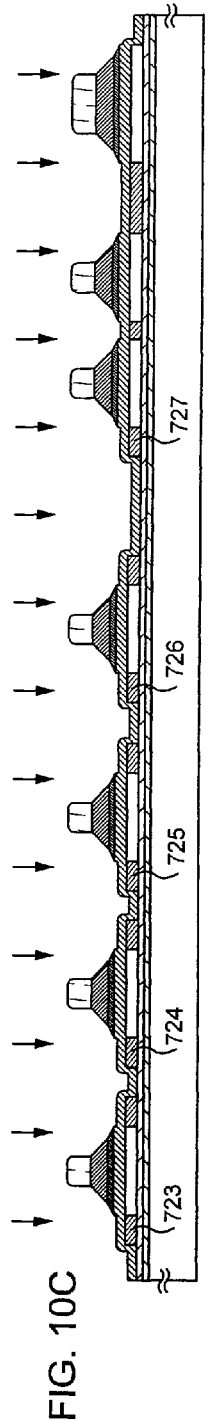
Figure 10D:
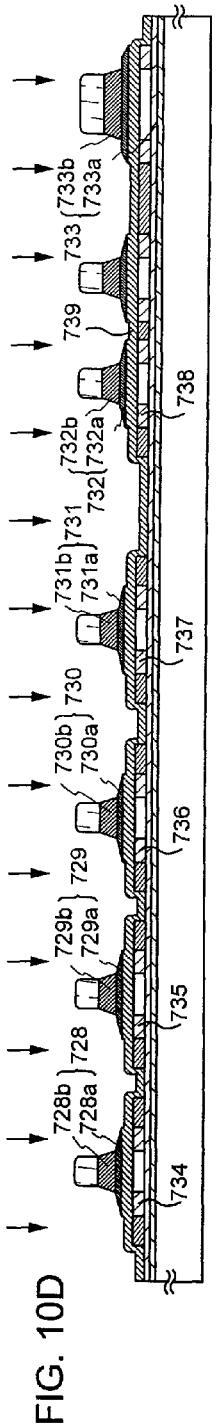
Figure 11A:
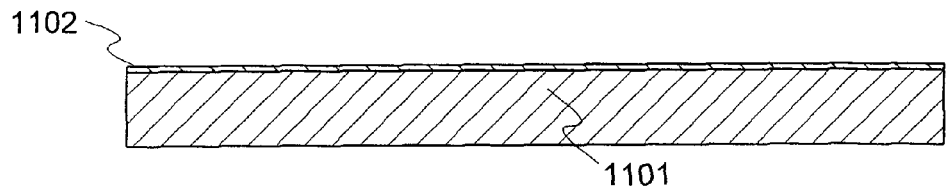
FIGS. 11A to 11F are cross-sectional views for illustrating Embodiment Mode 3.

First, as shown in FIG. 11A, a first insulating film 1102 is formed over one of surfaces of a semiconductor substrate 1101. As the semiconductor substrate, a single crystal silicon substrate, a germanium substrate, a compound semiconductor substrate formed using gallium arsenide or indium phosphide, or the like can be used. Further, the first insulating film 1102 is the same layer as the second insulating film 702b shown in FIGS. 10A to 10D and can be formed with a structure of two or more layers by stacking layers formed using silicon nitride, silicon nitride oxide, or silicon oxynitride. The first insulating film 1102 can be formed by chemical vapor deposition (CVD), sputtering, or the like. The first insulating film 1102 is preferably formed to a thickness greater than or equal to 50 nm and less than or equal to 200 nm. Note that chemical vapor deposition (CVD) in this specification includes plasma enhanced CVD, thermal CVD, and photo CVD in its category.

Note that silicon oxynitride refers to a substance which contains more oxygen than nitrogen and contains oxygen, nitrogen, silicon, and hydrogen at concentrations ranging from 55 to 65 atomic %, 0.5 to 20 atomic %, 25 to 35 atomic %, and 0.1 to 10 atomic %, respectively. Further, silicon nitride oxide refers to a substance which contains more nitrogen than oxygen and contains oxygen, nitrogen, silicon, and hydrogen at concentrations ranging from 5 to 30 atomic %, 20 to 50 atomic %, 25 to 35 atomic %, and 15 to 25 atomic %, respectively.

Figure 11B:
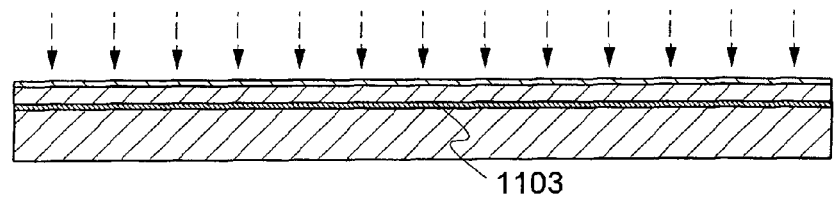

Next, as shown in FIG. 11B, ions which are accelerated by an electric field are introduced into the semiconductor substrate 1101 by irradiating the semiconductor substrate 1101 with an ion beam of the ions which are accelerated by an electric field through the first insulating film 1102, so that a region 1103 into which hydrogen is introduced is formed to reach a predetermined depth from the one of the surfaces of the semiconductor substrate 1101.

Figure 11C:
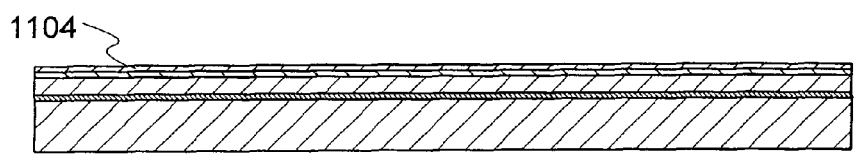

Next, as shown in FIG. 11C, a bonding layer 1104 is formed over the first insulating film 1102. The bonding layer 1104 is provided on a surface where the semiconductor substrate 1101 forms a bond with a base substrate. The bonding layer 1104 may have a single layer structure or a layered structure of two or more layers, and a surface which forms a bond with the substrate 1101 (hereinafter referred to as a bonding surface) preferably has a smooth surface and forms a hydrophilic surface.

The bonding layer 1104, the bonding surface of which, has a smooth surface and forms a hydrophilic surface can be formed using silicon oxide containing hydrogen, silicon nitride containing hydrogen, silicon nitride containing oxygen and hydrogen, silicon oxynitride, silicon nitride oxide, or the like.

As silicon oxide containing hydrogen, for example, silicon oxide manufactured by chemical vapor deposition using organosilane is preferable. This is because the base substrate and a single crystal semiconductor layer can be firmly bonded to each other by using the bonding layer 1104 formed using organosilane, for example, a silicon oxide film. As organosilane, a silicon containing compound such as tetraethoxysilane (abbreviation: TEOS) (chemical formula: $Si(OC_2H_5)_4$), tetramethylsilane (abbreviation: TMS) (chemical formula: $Si(CH_3)_4$), tetramethylcyclotetrasiloxane (abbreviation: TMCTS), octamethylcyclotetrasiloxane (abbreviation: OMCTS), hexamethyldisilazane (abbreviation: HMDS), triethoxysilane (chemical formula: $SiH(OC_2H_5)_3$), or trisdimethylaminosilane (chemical formula: $SiH(N(CH_3)_2)_3$) can be used.

Note that in the case of forming the bonding layer 1104 by using silicon oxide, the bonding layer 1104 can be formed by CVD using monosilane, disilane, or trisilane as a source gas. In addition, a silicon oxide layer which functions as the bonding layer may be a thermal oxidation film and preferably contains chlorine.

Silicon nitride containing hydrogen can be formed by plasma enhanced CVD using a silane gas and an ammonia gas. Further, hydrogen may be added to the above gases. Silicon nitride containing oxygen and hydrogen can be formed by plasma enhanced CVD using a silane gas, an ammonia gas, and a nitrous oxide gas. In each case, silicon oxide, silicon oxynitride, or silicon nitride oxide, which is manufactured by chemical vapor deposition such as plasma enhanced CVD, low pressure CVD, or atmospheric pressure CVD, which uses a silane gas or the like as a source gas, can be used as long as it contains hydrogen. In deposition by CVD, temperature at which degassing does not occur from the region 1103 into which hydrogen is introduced, which is formed in the semiconductor substrate 1101, is used. For example, deposition temperature is preferably lower than or equal to 350° C. Note that in heat treatment for cleaving the semiconductor layer from the semiconductor substrate 1101, heat treatment temperature which is higher than deposition temperature by CVD is used. In each case, the bonding layer 1104 may be any layer as long as it has a smooth surface and a surface with a hydroxy group.

The thickness of the bonding layer 1104 can be greater than or equal to 10 nm and less than or equal to 200 nm. Preferably, the thickness of the bonding layer 1104 is greater than or equal to 10 nm and less than or equal to 100 nm, more preferably greater than or equal to 20 nm and less than or equal to 50 nm.

Figure 11D:
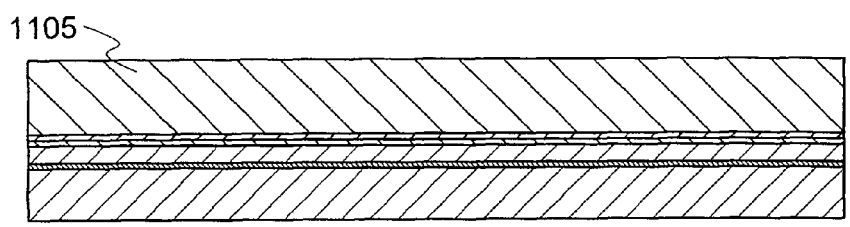

Next, as shown in FIG. 11D, the semiconductor substrate 1101 is disposed in contact with a substrate 1105 which is separately prepared. By disposing a surface of the bonding layer 1104 formed over the semiconductor substrate 1101 in contact with a surface of the substrate 1105, the semiconductor substrate 1101 and the substrate 1105 are bonded to each other. A hydrogen bond or van der Waals force acts on this bond. A hydrogen bond is formed when a surface of the substrate has a hydrophilic property, a hydroxy group or a water molecule functions as an adhesive agent, the water molecule is diffused by heat treatment, and a residual component forms a silanol group (Si—OH). Further, this bonding portion forms a covalent bond by formation of a siloxane bond (O—Si—O) due to release of hydrogen, so that the semiconductor substrate 1101 and the substrate 1105 are firmly bonded to each other.

The substrate 1105 is the same as the substrate 701 shown in FIG. 10A and can be a substrate having an insulating surface. As the substrate 1105, a glass substrate is preferably used. For example, a large-area mother glass substrate called the sixth generation (1500 mm×1850 mm), the seventh generation (1870 mm×2200 mm), or the eighth generation (2200 mm×2400 mm) is used. By manufacturing the semiconductor substrate with the large-area mother glass substrate used as the base substrate, the area of the mother glass substrate can be made larger. Accordingly, the number of display panels which can be manufactured from one substrate (the number of panels obtained per substrate) can be increased, so that productivity can be improved.

A surface of any of various glass substrates which are used in the electronics industry, such as aluminosilicate glass substrates, aluminoborosilicate glass substrates, and barium borosilicate glass substrates, preferably has a polished surface because flatness is extremely favorable. By bonding the polished surface of the glass substrate to a single crystal semiconductor substrate or the bonding layer formed on the single crystal semiconductor substrate, bonding defects can be reduced. The glass substrate may be polished with, for example, cerium oxide. By performing the polishing treatment, the single crystal semiconductor substrate can be attached to a substantially entire surface of the glass substrate, which includes end regions on the main surface.

Note that in order to favorably bond the substrate 1105 and the bonding layer 1104 to each other, bonding surfaces may be activated. For example, one or both of the bonding surfaces are irradiated with an atomic beam or an ion beam. In the case of utilizing an atomic beam or an ion beam, an inert gas neutral atomic beam or an inert gas ion beam of argon or the like can be used. Alternatively, plasma irradiation or radical treatment for activating the bonding surfaces can be performed. With such surface treatment, different kinds of materials can be easily bonded to each other even at a temperature lower than or equal to 400° C.

After the substrate 1105 and the semiconductor substrate 1101 are bonded to each other with the bonding layer 1104 interposed therebetween (see FIG. 11D), one or both of heat treatment and pressure treatment are preferably performed. By performing heat treatment and/or pressure treatment, the substrate 1105 and the semiconductor substrate 1101 can be bonded to each other more firmly. The heat treatment is performed at temperature lower than or equal to the allowable temperature limit of the substrate 1105. The pressure treatment is performed taking the pressure resistance of the substrate 1105 and the semiconductor substrate 1101 into consideration so that pressure can be applied in a perpendicular direction to the bonding surfaces.

Figure 11E:
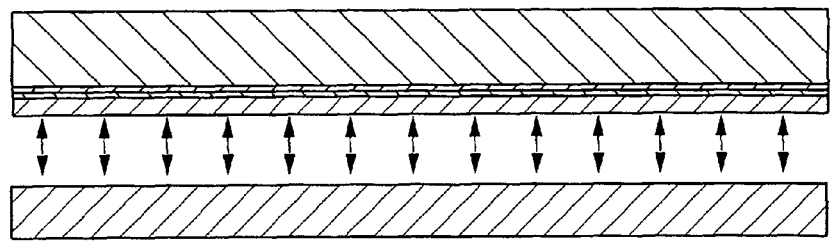
Figure 11F:
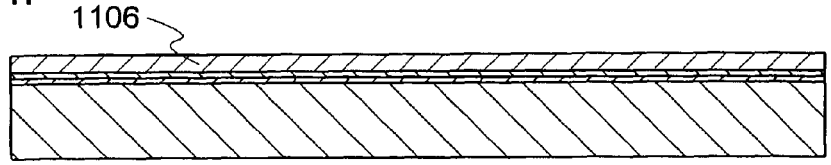

Next, as shown in FIG. 11E, by performing the heat treatment on the semiconductor substrate 1101, the semiconductor substrate 1101 is cleaved with the region 1103 used as a cleavage plane. The heat treatment is preferably performed at a temperature higher than or equal to the deposition temperature of the bonding layer 1104 and lower than or equal to the allowable temperature limit of the substrate 1105. For example, by performing the heat treatment at a temperature higher than or equal to 400° C. and lower than or equal to 700° C., the volume of microvoids formed in the region 1103 is changed, so that cleavage is performed along the region 1103. Since the bonding layer 1104 is bonded to the substrate 1105, a semiconductor layer which is separated from the semiconductor substrate 1101 is firmly fixed to the substrate 1105, and a semiconductor layer which has the same crystal structure and crystal orientation as the semiconductor substrate can be left on the substrate 1105, as shown in FIG. 11F.

The heat treatment at the temperature higher than or equal to 400° C. and lower than or equal to 700° C. may be performed sequentially with the same apparatus as the heat treatment for improving the bonding strength, or may be performed with a different apparatus. For example, after heat treatment is performed in a furnace at 200° C. for 2 hours, the temperature is increased to around 600° C. and held for 2 hours, the temperature is decreased to a temperature range of 400° C. to room temperature, and then the substrate is taken out of the furnace. Alternatively, heat treatment may be performed with a temperature increased from room temperature. Further alternatively, after heat treatment may be performed in a furnace at 200° C. for 2 hours, heat treatment may be performed at a temperature range of 600° C. to 700° C. with a rapid thermal annealing (RTA) apparatus for 1 minute to 30 minutes (e.g., at 600° C. for 7 minutes, or at 650° C. for 7 minutes).

By performing the heat treatment at the temperature higher than or equal to 400° C. and lower than or equal to 700° C., the bond between the bonding layer 1104 and the substrate 1105 transfers from the hydrogen bond to a covalent bond; an element added to the region 1103 precipitates to raise the pressure; and the semiconductor substrate 1101 is cleaved so that a semiconductor layer can be formed. After the heat treatment is performed, one of the substrate 1105 and the semiconductor substrate 1101 is provided over the other thereof, and the substrate 1105 and the semiconductor substrate 1101 can be separated from each other without application of large force. For example, the substrate 1105 and the semiconductor substrate 1101 can be easily separated from each other by lifting the substrate provided over the other by a vacuum chuck. In this case, if the substrate provided below the other is fixed by a vacuum chuck or a mechanical chuck, deviation in a horizontal direction is not generated, so that both the substrate 1105 and the semiconductor substrate 1101 can be separated from each other.

Note that at this time, in order to improve the crystallinity of a semiconductor layer 1106 formed on the substrate 1105, it is possible to irradiate a surface of the semiconductor layer with a laser beam. By irradiating the surface of the semiconductor layer with a laser beam, defects in the semiconductor layer can be reduced.

Further, in order to improve the flatness of the surface of the semiconductor layer 1106 formed on the substrate 1105, it is possible to perform either dry etching or wet etching. By performing either dry etching or wet etching, part of the semiconductor layer 1106 is removed, so that roughness of the surface can be reduced.

Further, in order to improve the crystallinity of the surface of the semiconductor layer 1106 formed on the substrate 1105, it is possible to perform heat treatment. For example, heat treatment is preferably performed at a temperature higher than or equal to 500° C. and lower than or equal to 700° C. With this heat treatment, defects and distortion of the semiconductor layer 1106, which are not reduced by irradiation with a laser beam, can be reduced and relieved.

With the above method, the semiconductor layer 1106 provided on the substrate 1105 with an insulating film interposed therebetween, which is shown in FIG. 11F, can be formed. Note that the method shown in FIGS. 11A to 11F is just an example, and the present invention is not limited to this. The semiconductor layer 1106 can be formed using a different method.

FIG. 10A is described again. A gate insulating film 708 which covers the first semiconductor layer 703, the second semiconductor layer 704, the third semiconductor layer 705, the fourth semiconductor layer 706, and the fifth semiconductor layer 707 separated into island shapes and the second insulating film 702b is formed. The gate insulating film 708 is formed by plasma enhanced CVD or sputtering. In addition, a first conductive film 709a and a second conductive film 709b for forming a gate electrode are formed over the gate insulating film 708.

The gate insulating film 708 can be formed using a single layer structure or a layered structure of any one of or a plurality of silicon oxide, silicon nitride, silicon oxynitride, and silicon nitride oxide.

Each of the first conductive film 709a and the second conductive film 709b can be formed using an element such as tantalum, tungsten, titanium, molybdenum, aluminum, copper, chromium, or niobium, or an alloy material or a compound material containing such an element as its main component. In this embodiment mode, the first conductive film 709a is formed using tantalum nitride and the second conductive film 709b is formed using tungsten.

Next, as shown in FIG. 10B, resist masks 710 to 715 are formed and first etching treatment for forming gate electrodes is performed. Although the etching is not limited to a particular method, an ICP (inductively coupled plasma) etching is preferably used.

In the above etching conditions, end portions of the gate electrodes can have tapered shapes due to the shapes of the resist mask and an advantageous effect of bias voltage applied on the substrate side. Further, since the etching is performed without leaving a residue over the gate insulating film, surfaces to which the gate insulating film 708 is exposed are partly etched by over-etching treatment. Thus, through the first etching treatment, conductive films 716 to 721 (first conductive films 716a to 721a and second conductive films 716b to 721b) with first shapes, which are formed of first conductive films and second conductive films, and a gate insulating film 722 are formed.

Then, as shown in FIG. 10C, first doping treatment is performed so that an impurity which imparts n-type conductivity (a donor) is added. The doping is performed by either an ion doping method or an ion implantation method. As an impurity element which imparts n-type conductivity, an element which belongs to Group 15, typically, phosphorus (P) or arsenic (As) is used. The conductive films with the first shapes are used as masks. Thus, first impurity regions 723 to 727 are formed.

Second etching treatment shown in FIG. 10D is isotropic etching treatment by ICP (inductively coupled plasma) etching and conductive films 728 to 733 (first conductive films 728a to 733a and second conductive films 728b to 733b) with second shapes are formed. Reference numeral 739 denotes a gate insulating film. Regions of the gate insulating film 739, which are not covered with the conductive films 728 to 733 with the second shapes, are reduced in thickness because they are etched.

Subsequently, second doping treatment is performed. The dosage is set lower than that in the first doping treatment, and an impurity which imparts n-type conductivity (a donor) is added in a condition of high acceleration voltage. Second impurity regions 734 to 738 are formed inside the first impurity regions formed in the island-shaped semiconductor layers in FIG. 10C. This doping is performed in such a manner that an impurity element is added to regions below the conductive films 728a to 733a with the second shapes by using the conductive films 728b to 733b with the second shapes as masks with respect to the impurity element.

Then, as shown in FIG. 12A, third etching treatment is performed to etch the gate insulating film. Accordingly, the conductive films 728a to 733a with the second shapes are also etched and end portions thereof are decreased due to recession, so that conductive films 740 to 745 (first conductive films 740a to 745a and second conductive films 740b to 745b) with third shapes are formed. Reference numeral 746 denotes a remaining gate insulating film. The etching may be further performed so that the surface of the semiconductor layers is exposed.

Resist masks 758 to 760 are formed with respect to p-channel TFTs as shown in FIG. 12B, and an impurity which imparts p-type conductivity (an acceptor) is added to the island-shaped semiconductor layers for forming the p-channel TFTs. By performing the doping, third impurity regions 767a, 767b, 767c, 768a, 768b, and 768c are formed in the island-shaped semiconductor layers. The impurity which imparts p-type conductivity (the acceptor) is selected from an element which belongs to Group 13, typically, boron (B) is used.

Through the above steps, the impurity regions are formed in the semiconductor layers. After that, in a step shown in FIG. 12C, resist masks 769 and 770 are formed and the conductive film 743 with the third shape, which is formed over the semiconductor layer 706 for forming the photodiode, is removed. The conductive films 740, 741, 742, and 744 with the third shapes serve as gate electrodes, and the conductive film 745 with the third shape serves as a capacitor wiring.

Figure 13A:
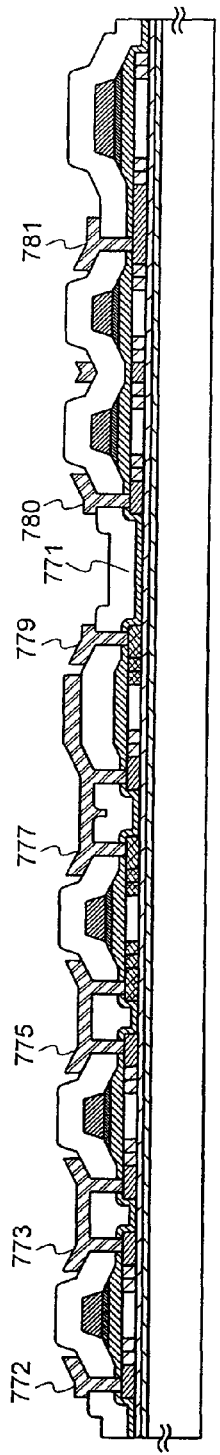
FIGS. 13A and 13B are cross-sectional views for illustrating Embodiment Mode 3.

Next, as shown in FIG. 13A, a first interlayer insulating film 771 formed of a silicon nitride film or a silicon oxynitride film is formed by plasma enhanced CVD. Then, a step of activating the impurity element added to the respective island-shaped semiconductor layers is performed in order to control the conductivity type. The activation is preferably performed by thermal annealing using an annealing furnace. Alternatively, laser annealing or rapid thermal annealing (RTA) can be used.

A contact hole is formed in the first interlayer insulating film 771 and an optical sensor output wiring 772, a connection wiring 773, an optical sensor power supply line 775, a connection wiring 777, a common wiring 779, a source signal line 780, and a drain wiring 781 are formed using aluminum (Al), titanium (Ti), tantalum (Ta), or the like. Further, the connection wiring 777 extends over a photodiode 804 in order to shield light.

Then, over these wirings, a passivation film 782 and a second interlayer insulating film 783 are formed. The passivation film 782 can be formed using a silicon nitride film. Further, the second interlayer insulating film 783 is formed using an organic resin. For an organic resin film, polyimide, acrylic, polyimide amide, or the like can be used.

Figure 13B:
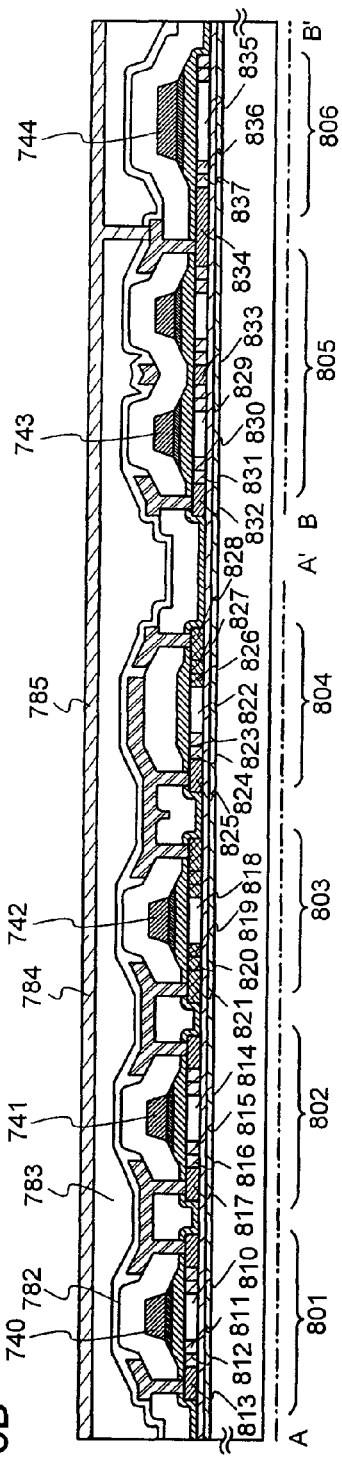

Next, as shown in FIG. 13B, a contact hole which reaches the drain wiring 781 is formed in the second interlayer insulating film 783 and the passivation film 782 to form a pixel electrode 784. In the case of a transmissive liquid crystal display device, the pixel electrode is formed using a transparent conductive film (indium tin oxide (ITO), an alloy of indium oxide and zinc oxide ($In_2O_3$—ZnO), zinc oxide (ZnO) or the like). In the case of a reflective liquid crystal display device, the pixel electrode is formed of a reflective film (a metal film of aluminum or the like). Alternatively, in the case of a display device having an EL element as a display element, the pixel electrode is formed using a material used for an anode or a cathode of a light-emitting element.

In this manner, a buffer transistor 801, a selection transistor 802, a reset transistor 803, the photodiode 804, a pixel transistor 805 and a storage capacitor 806 can be formed.

The buffer transistor 801 is an n-channel transistor and has a channel formation region 810, a second impurity region 811 which is formed of the conductive film 740 with the third shape and overlaps with the gate electrode (a gate overlapped drain (GOLD) region)), a second impurity region 812 which is formed outside the gate electrode (a lightly doped drain (LDD) region), and a first impurity region 813 which functions as a source or a drain.

The selection transistor 802 is also an n-channel transistor and has a channel formation region 814, a second impurity region 815 which is formed of the conductive film 741 with the third shape and overlaps with the gate electrode, a second impurity region 816 which is formed outside the gate electrode, and a first impurity region 817 which functions as a source or a drain.

The reset transistor 803 is a p-channel transistor and has a channel formation region 818 and third impurity regions 819 to 821 which function as sources or drains.

The photodiode 804 has third regions 826 to 828 to which an impurity which imparts p-type conductivity is added, a first impurity region 825 and second impurity regions 823 and 824 to which an impurity which imparts n-type conductivity is added, and an intrinsic region 822 to which an impurity is not added. Thus, the photodiode 804 has a so-called pin-type structure. In addition, the first impurity region 825 is in contact with the connection wiring 777 and is connected to a drain side of the reset transistor 803. Meanwhile, the third impurity region 828 is in contact with the common wiring 779.

The pixel transistor 805 has a channel formation region 829, a second impurity region 830 which overlaps with the gate electrode (a GOLD region) formed of the conductive film 743 with the third shape and, a second impurity region 831 which is formed outside the gate electrode (an LDD region), and first impurity regions 832, 833, and 834 which function as sources or drains. Further, a semiconductor layer 835 which functions as one of electrodes of the storage capacitor 806 is sequentially formed from the first impurity regions and is provided with regions 836 and 837 to which an impurity is added at the same concentration as the second impurity region at end portions.

Figure 14:
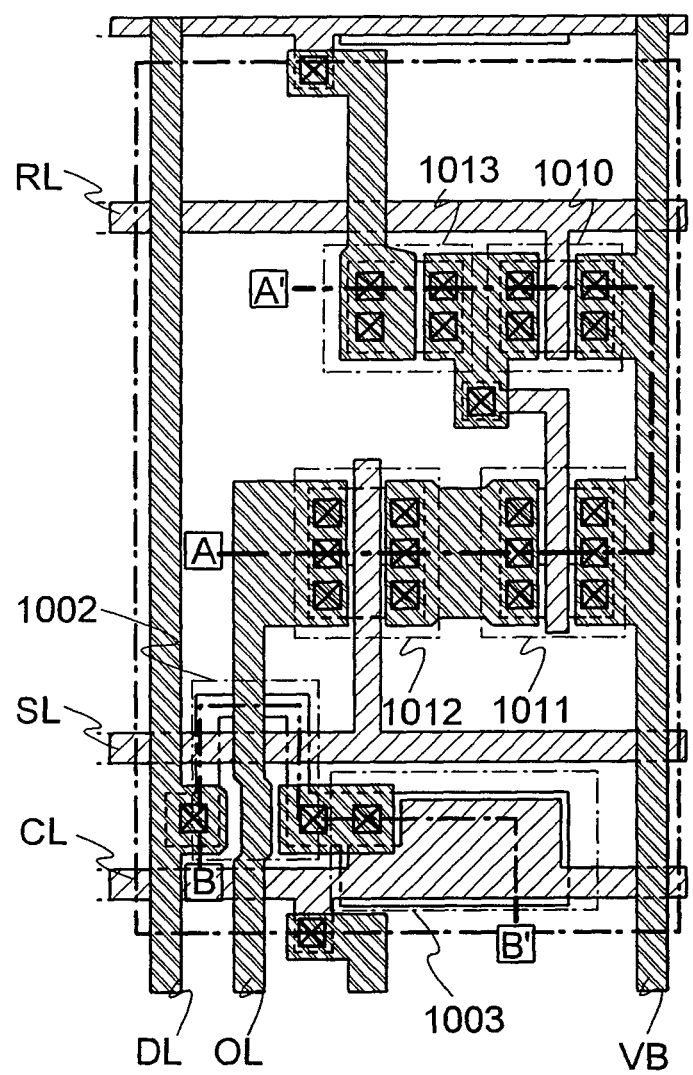
FIG. 14 is a top view for illustrating Embodiment Mode 3.

FIG. 14 is a top view of such a pixel circuit. In FIG. 14, line A-A' and line B-B' correspond to line A-A' and line B-B' shown in FIG. 13B, respectively. Further, reference numerals used in the top view of the pixel circuit shown in FIG. 14 are similar to those of the pixel portion shown in FIGS. 9A and 9B.

As described in this embodiment mode, in the mobile phone of the present invention, the display element and the optical sensor are provided in each of a plurality of pixels and can be formed concurrently through a sequence of steps. Further, as described in Embodiment Mode 1, functions used in the mobile phone, in particular, functions related to display and input on the display surface are switched by an arithmetic circuit in accordance with signals from a gradient detection portion. Therefore, a mobile phone which can be used without hampering convinience can be provided. Further, a mobile phone which optimizes the size or arrangement of the display portion in which optical sensors are provided depending on functions of a mobile phone to be used and an operating method of the mobile phone, so that operability can be improved.

Note that this embodiment mode can be implemented in combination with any technical component in other embodiment modes in this specification.

Embodiment Mode 4

Figure 15:
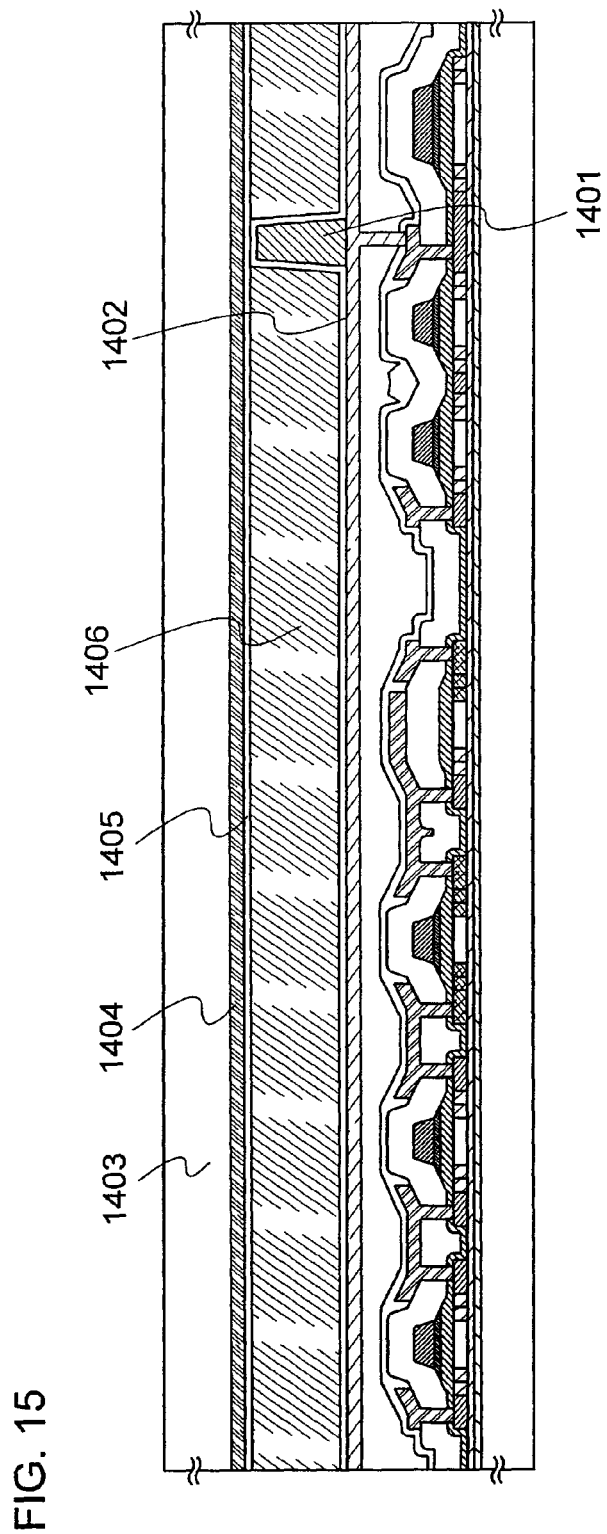
FIG. 15 is a cross-sectional view for illustrating Embodiment Mode 4.

In this embodiment mode, a step of manufacturing the display portion of the mobile phone from the substrate over which components are manufactured up to the pixel electrode and the transistors are formed in Embodiment Mode 3 is described. In FIG. 15, a step in the case where a transmissive liquid crystal display device is used for the display portion of the mobile phone is described. First, after the substrate over which the transistors in the state of FIG. 13B are formed is manufactured in accordance with Embodiment Mode 3, a columnar spacer 1401 is formed, as shown in FIG. 15. Then, an alignment film 1402 is formed so as to cover the spacer 1401 and rubbing treatment is performed.

Figure 16:
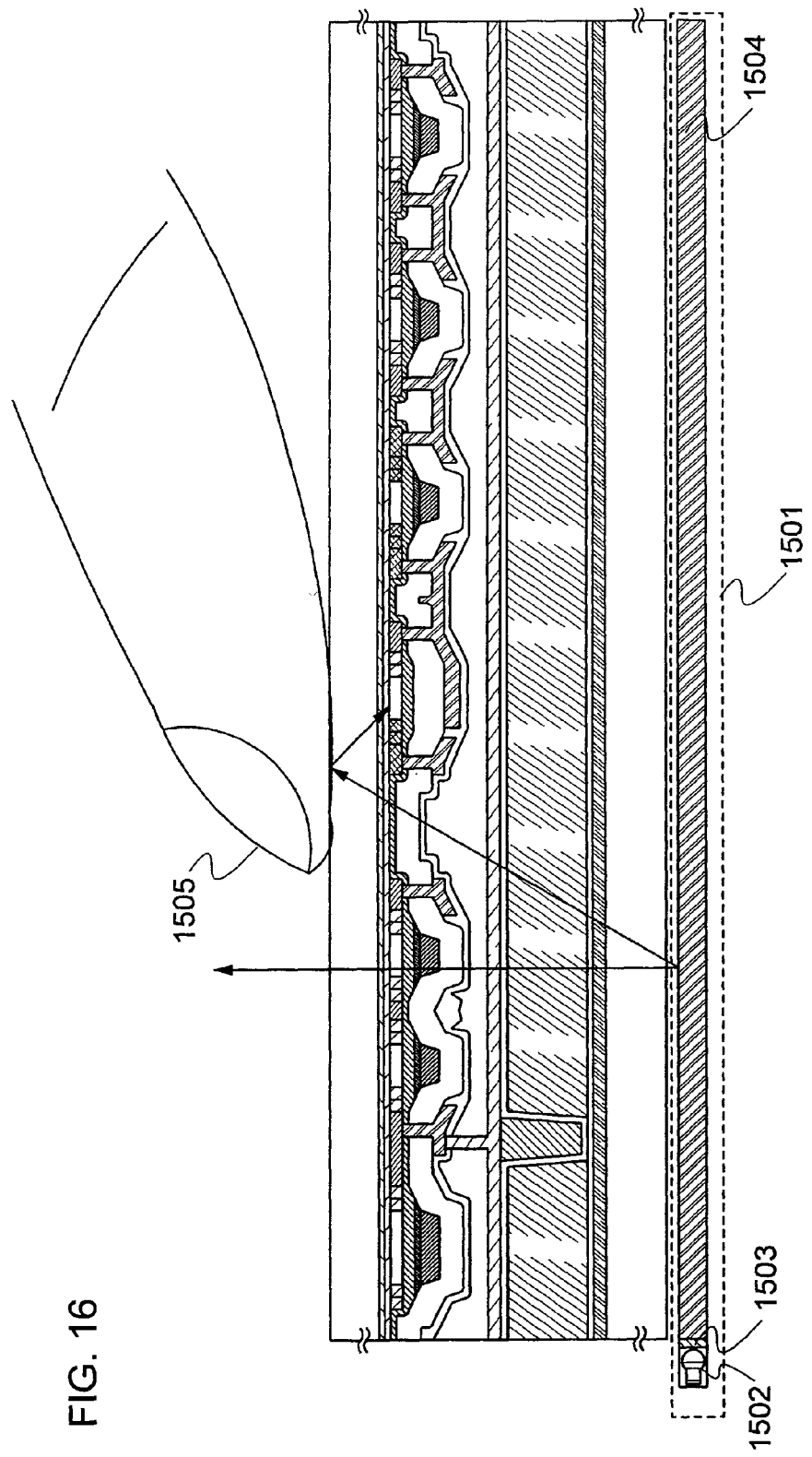
FIG. 16 is a cross-sectional view for illustrating Embodiment Mode 4.

After a counter substrate 1403 is provided with a counter electrode 1404 and an alignment film 1405, rubbing treatment is performed. Then, the substrate over which the transistors are formed and the counter substrate are attached to each other. After that, a liquid crystal material is injected between the both substrates to form a liquid crystal layer 1406. In this manner, a display portion of an active matrix liquid crystal display device which includes a pixel circuit formed of an optical sensor and a display element, which is shown in FIG. 16, is completed. By providing a backlight unit 1501 as shown in FIG. 16, the display portion of the completed active matrix liquid crystal display device can display images and can perform detection with the optical sensor. The backlight unit 1501 includes, for example, a light source 1502, a diffusion plate 1503, and a light guide plate 1504. Light from the light source 1502 is diffused by the diffusion plate and is emitted on the liquid crystal layer side (on the counter substrate side) through the light guide plate. The light is transmitted through the transistors and is delivered to an object 1505 to which light is delivered. In accordance with the existence or nonexistence of the object 1505 to which light is delivered, the light is reflected or transmitted and whether the light enters or does not enter the photodiode is selected. Thus, the object to which light is delivered can be read as an electric signal by the photodiode, which is an optical sensor.

Note that as the light source, either a cold cathode fluorescent lamp or a light-emitting diode may be used. Note that as the backlight unit, a backlight unit where light-emitting diodes are provided over the entire surface and are used as planar light sources may be used. In this case, it is also possible to use a structure where the diffusion plate and the light guide plate are eliminated.

Note that by emitting the light from the light source 1502 intermittently, detection can be performed by the photodiode, which is an optical sensor, with external light and light from the backlight unit separated from each other, which is preferable.

Note that by forming the semiconductor layer included in the photodiode, which is an optical sensor, over a single crystal silicon substrate as described in Embodiment Mode 3, the wavelength of light to be absorbed has a peak of relative sensitivity around a wavelength of 900 nm. In this case, a structure may be used in which the light from the backlight unit is used as a first light source for the display element, which is visible light, and the photodiode which is an optical sensor is used as a second light source which is near-infrared light for detecting reflected light. The first light source and the second light source can be switched by a display control circuit to favorably display images with the display element and can improve sensitivity of light of the photodiode which is an optical sensor, concurrently, which is preferable.

Figure 17:
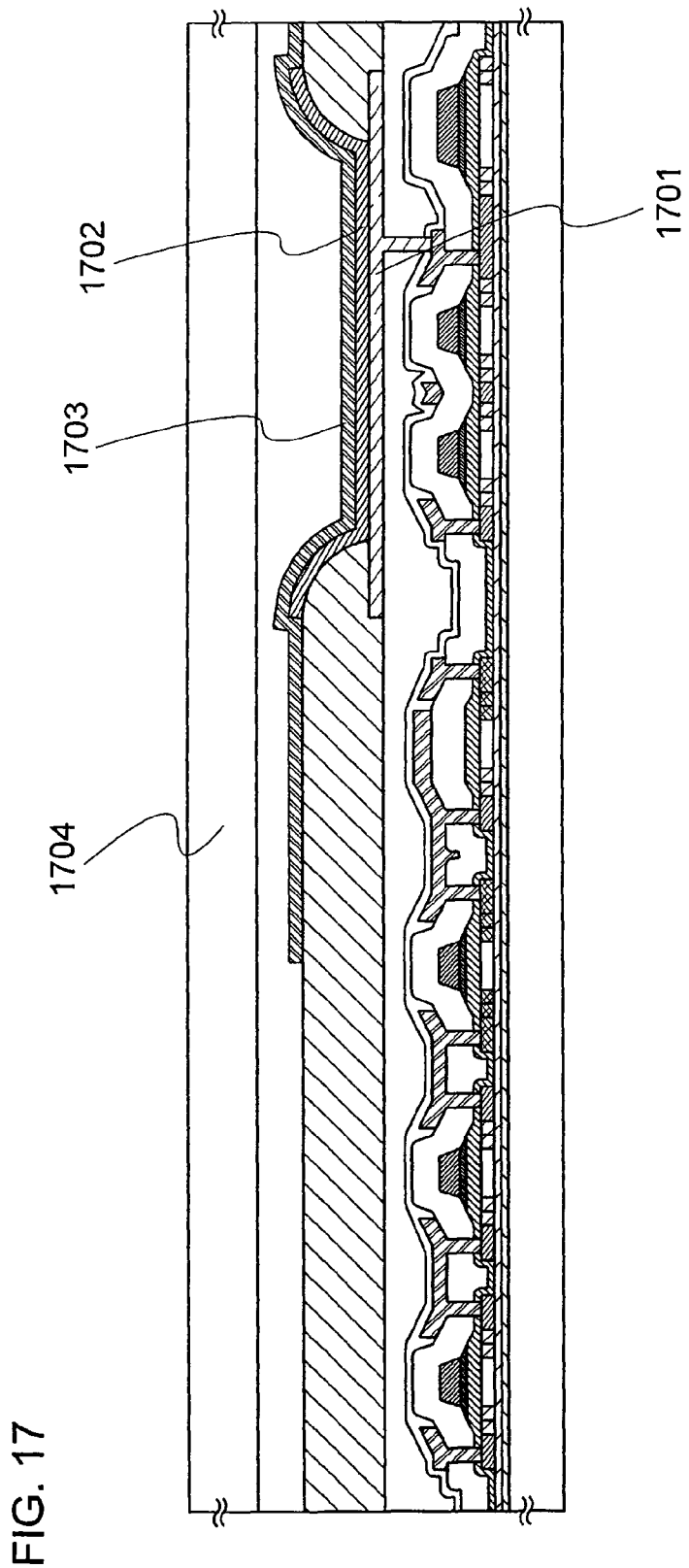
FIG. 17 is a cross-sectional view for illustrating Embodiment Mode 4.
Figure 18:
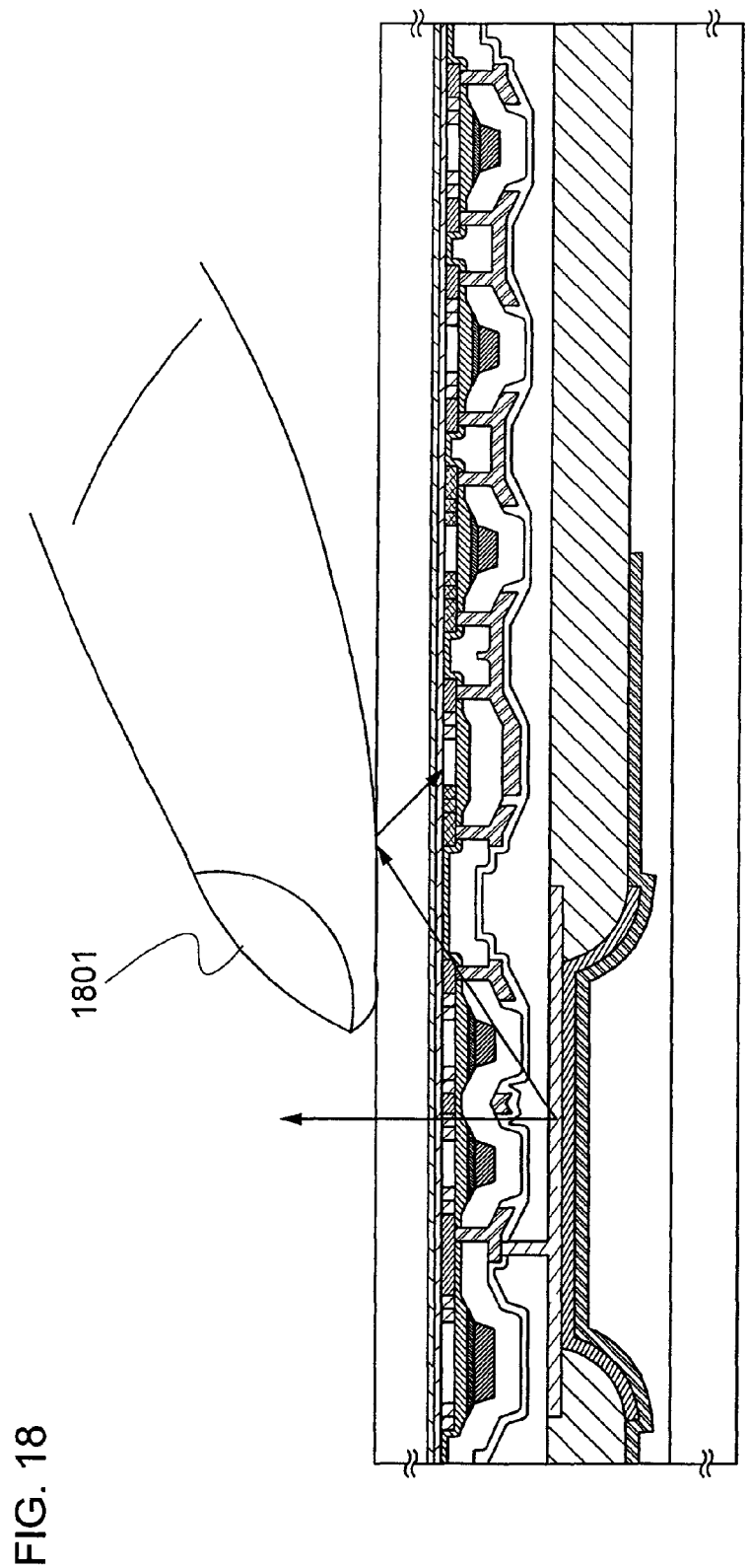
FIG. 18 is a cross-sectional view for illustrating Embodiment Mode 4.

Next, in FIG. 17, a step of manufacturing the display portion of the mobile phone having an EL element as a display element, from the substrate over which the components are manufactured up to the pixel electrode and the transistors are formed in Embodiment Mode 3 is described. In FIG. 17, a step in the case where a so-called bottom emission-type EL element, which emits light from a side on which the transistors are provided, is used for the display portion of the mobile phone is described. First, after the substrate over which the transistors in the state of FIG. 13B are formed is manufactured in accordance with Embodiment Mode 3, a light-emitting layer 1702 is formed over an electrode 1701 which serves as an anode, as shown in FIG. 17. Next, an electrode 1703 which serves as a cathode of the light-emitting element is formed so as to cover the light-emitting layer 1702. Then, a counter substrate 1704 and the substrate over which the transistors are formed are attached to each other. In this manner, a display portion of an active matrix light-emitting device which includes a pixel circuit formed of an optical sensor and a display element, which is shown in FIG. 17, is completed. By emitting light from the light-emitting layer 1702 as shown in FIG. 18, the display portion of the completed active matrix light-emitting device can display images and can perform detection with the optical sensor. The light from the light-emitting layer 1702 is emitted on a transistor substrate side. The light is delivered to an object 1801 to which light is delivered. In accordance with the existence or nonexistence of the object 1801 to which light is delivered, the light is reflected or transmitted and whether the light enters or does not enter the photodiode is selected. Thus, the object to which light is delivered can be read as an electric signal by the photodiode which is an optical sensor.

Note that by emitting the light from the light-emitting layer 1702 intermittently, detection can be performed by the photodiode, which is an optical sensor, with external light and light from the light-emitting layer separated from each other, which is preferable.

Note that by forming the semiconductor layer included in the photodiode, which is an optical sensor, over a single crystal silicon substrate as described in Embodiment Mode 3, the wavelength of light to be absorbed has a peak of relative sensitivity around a wavelength of 900 nm. In this case, a structure is preferably used in which a backlight unit which has a light source for emitting near-infrared light so that the photodiode detects reflected light as well as visible light emitted from the light-emitting element is provided. By operating the light source for emitting near-infrared light intermittently by a display control circuit, power consumption can be reduced and sensitivity of light of the photodiode which is an optical sensor can be improved concurrently, which is preferable.

Note that by forming the semiconductor layer included in the photodiode, which is an optical sensor, over a single crystal silicon substrate as described in Embodiment Mode 3, the wavelength of light to be absorbed can have a peak of relative sensitivity around a wavelength of 900 nm. In the case of performing color display, sensitivity of light of R among R (red), G (green), and B (blue) can be made higher. Therefore, a structure where the photodiode is provided corresponding to a pixel which includes a display element of R can be used. By using the structure where the photodiode is provided corresponding to a pixel which includes a display element of R, the number of elements included in a pixel circuit portion and power consumption can be reduced. Thus, operating time of the mobile phone per charge can be extended.

Further, by forming the semiconductor layer included in the photodiode, which is an optical sensor, over the single crystal silicon substrate as described above, the wavelength of light to be absorbed can have a peak of relative sensitivity around a wavelength of 900 nm and the sensitivity of the photodiode provided corresponding to the pixel which includes the display element of R can be made higher. Therefore, application to authentication utilizing blood vessels of a user is possible. Information related to the positions of the blood vessels of the user is read from all or part of hands by an image sensor formed of the photodiode provided in each pixel. By providing a mobile phone with an authentication function, a function of increasing security of information stored in the mobile phone can be added, which is preferable.

As described in this embodiment mode, in the mobile phone of the present invention, the display element and the optical sensor are provided in each of plurality of pixels. Further, as described in Embodiment Mode 1, functions used in the mobile phone, in particular, functions related to display and input on the display surface are switched by an arithmetic circuit in accordance with signals from a gradient detection portion. Therefore, a mobile phone which can be used without hampering convinience can be provided. Further, a mobile phone which optimizes the size or arrangement of the display portion in which optical sensors are provided depending on functions of a mobile phone to be used and an operating method of the mobile phone, so that operability can be improved.

Note that this embodiment mode can be implemented in combination with any technical component in other embodiment modes in this specification.

Embodiment Mode 5

Figure 19:
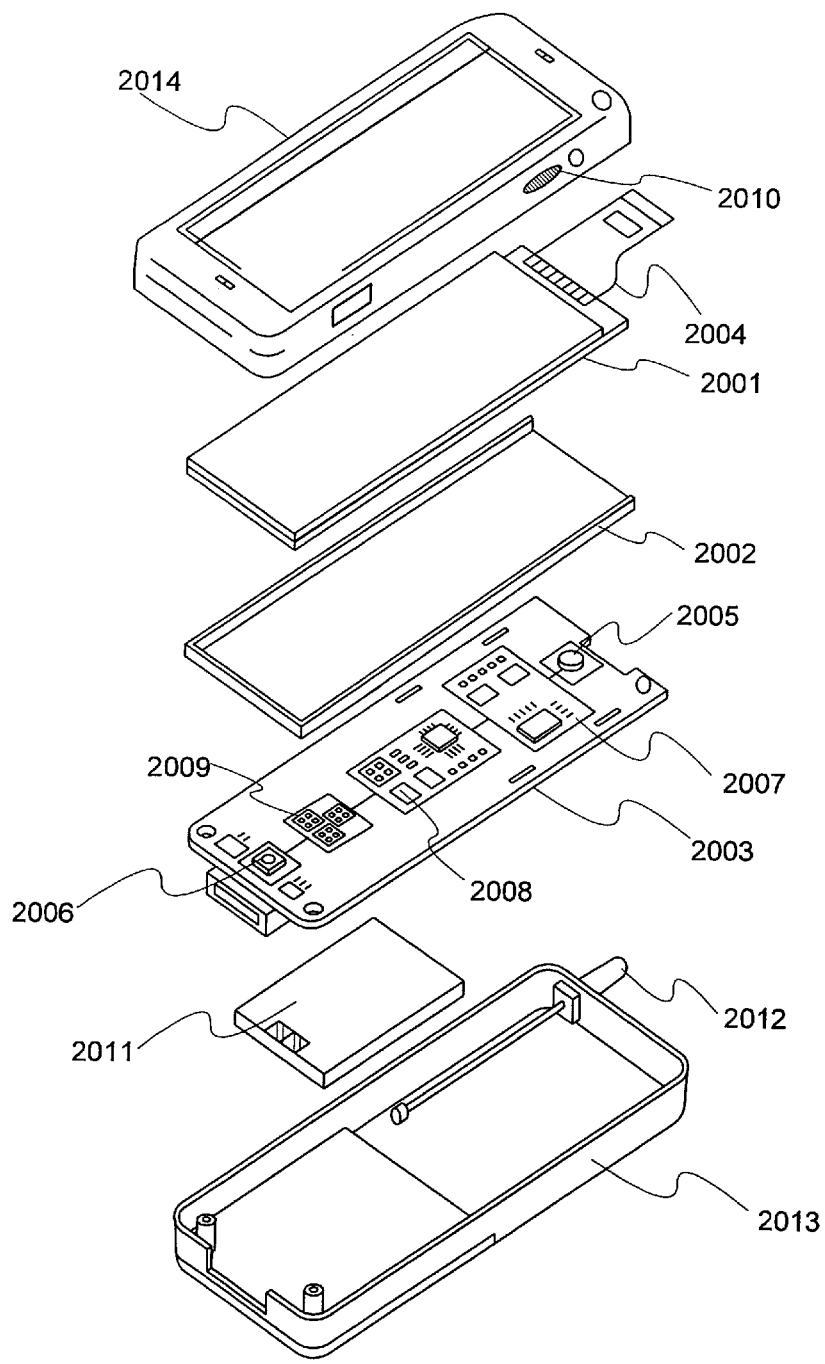
FIG. 19 is a perspective view for illustrating Embodiment Mode 5.

Next, with reference to FIG. 19, examples of the structures of a display panel which includes a pixel circuit having a display element and an optical sensor, and a mobile phone which includes a gradient detection portion are described.

A display panel 2001 is incorporated in a housing 2002 so as to be detachable. The shape or size of the housing can be changed as appropriate in accordance with the size of the display panel 2001. The housing 2002 to which the display panel is fixed is fitted into a printed circuit board 2003 and assembled as a module.

The display panel 2001 is connected to the printed circuit board 2003 through an FPC 2004. The printed circuit board 2003 includes a speaker 2005, a microphone 2006, a transmitting/receiving circuit 2007, a signal processing circuit 2008 which includes an arithmetic circuit, a display portion control circuit, and the like, and a gradient detection portion 2009. Such a module is combined with an operation key 2010, a battery 2011, and an antenna 2012 and is stored in a housing 2013. A pixel portion of the display panel 2001 is provided so that it can be seen from an opening window provided for a housing 2014.

In the display panel 2001, a pixel circuit portion and part of peripheral driver circuits (a driver circuit whose operation frequency is low among a plurality of driver circuits) may be formed over the same substrate by using transistors; and part of the peripheral driver circuits (a driver circuit whose operation frequency is high among the plurality of driver circuits) may be formed over an IC chip. Then, the IC chip may be mounted on the display panel 2001 by COG (chip on glass). Alternatively, the IC chip may be connected to a glass substrate by using TAB (tape automated bonding) or a printed circuit board. With such a structure, power consumption of a display device can be reduced and operation time of the mobile phone per charge can be extended. Further, cost of the mobile phone can be reduced.

As described in this embodiment mode, in the mobile phone of the present invention, the display element and the optical sensor are provided in each of plurality of pixels. Further, as described in Embodiment Mode 1, functions used in the mobile phone, in particular, functions related to display and input on the display surface are switched by an arithmetic circuit in accordance with signals from a gradient detection portion. Therefore, a mobile phone which can be used without hampering convinience can be provided. Further, a mobile phone which optimizes the size or arrangement of the display portion in which optical sensors are provided depending on functions of a mobile phone to be used and an operating method of the mobile phone, so that operability can be improved.

Note that this embodiment mode can be implemented in combination with any technical component in other embodiment modes in this specification.

This application is based on Japanese Patent Application serial no. 2007-312857 filed with Japan Patent Office on Dec. 3, 2007, the entire contents of which are hereby incorporated by reference.

What is claimed is:

1. A mobile phone comprising:
    a display portion having a rectangle shape;
    an imaging lens;
    a speaker; and
    a microphone,
    wherein the imaging lens is provided at a first corner of the rectangle shape of the display portion, the speaker is provided at a second corner of the rectangle shape of the display portion, and the microphone is provided at a third corner of the rectangle shape of the display portion, and
    wherein the display portion is configured to display a first input key display region and a second input key display region with a character display region interposed therebetween so that a user operates the first input key display region with his/her left hand and the second input key display region with his/her right hand.

2. The mobile phone according to claim 1, wherein the mobile phone further comprises:
    a pixel circuit portion where a plurality of pixels and a plurality of transistors are arranged;
    an optical sensor provided in each of the plurality of pixels;
    a display element;
    an optical sensor control circuit connected to an optical sensor driver circuit which is configured to drive the optical sensor and read a signal from the optical sensor;
    a display portion control circuit connected to a display element driver circuit which is configured to drive the display element;
    a gradient detection portion which is configured to detect whether a gradient of the mobile phone from a viewpoint is in a first state, a second state, or a third state, and to output a signal in accordance with the gradient, wherein the pixel circuit portion displays images of television broadcasts in the first state, and displays character input keys in the second state and the third state, and wherein the second state and the third state have a larger gradient than the first state from the viewpoint; and
    an arithmetic circuit which is configured to perform switching of functions in accordance with a function used by the user related to display and input on a display surface in accordance with the gradient.

3. The mobile phone according to claim 2, wherein the display element is one of a liquid crystal element, an EL element, and an electrophoretic element.

4. The mobile phone according to claim 2, wherein the gradient detection portion is one of a gyroscope and a triaxial acceleration sensor.

5. The mobile phone according to claim 2, wherein the optical sensor is a photodiode.

6. A mobile phone comprising:
    a display portion having a rectangle shape;
    an imaging lens;
    a speaker; and
    a microphone,
    wherein the speaker and the microphone are provided diagonally at corners of the rectangle shape of the display portion,
    wherein the imaging lens is provided at a corner opposite to the corner where the speaker is provided, and
    wherein the display portion is configured to display a first input key display region and a second input key display region with a character display region interposed therebetween so that a user operates the first input key display region with his/her left hand and the second input key display region with his/her right hand.

7. The mobile phone according to claim 6, wherein the mobile phone further comprises:
    a pixel circuit portion where a plurality of pixels and a plurality of transistors are arranged;
    an optical sensor provided in each of the plurality of pixels;
    a display element;
    an optical sensor control circuit connected to an optical sensor driver circuit which is configured to drive the optical sensor and read a signal from the optical sensor;
    a display portion control circuit connected to a display element driver circuit which is configured to drive the display element;
    a gradient detection portion which is configured to detect whether a gradient of the mobile phone from a viewpoint is in a first state, a second state, or a third state, and to output a signal in accordance with the gradient, wherein the pixel circuit portion displays images of television broadcasts in the first state, and displays character input keys in the second state and the third state, and wherein the second state and the third state have a larger gradient than the first state from the viewpoint; and
    an arithmetic circuit which is configured to perform switching of functions in accordance with a function used by the user related to display and input on a display surface in accordance with the gradient.

8. The mobile phone according to claim 7, wherein the display element is one of a liquid crystal element, an EL element, and an electrophoretic element.

9. The mobile phone according to claim 7, wherein the gradient detection portion is one of a gyroscope and a triaxial acceleration sensor.

10. The mobile phone according to claim 7, wherein the optical sensor is a photodiode.

* * * * *